United States Patent
Atwater et al.

(10) Patent No.: US 7,346,248 B2
(45) Date of Patent: Mar. 18, 2008

(54) FERROELECTRIC NANOPHOTONIC MATERIALS AND DEVICES

(75) Inventors: Harry A. Atwater, S. Pasadena, CA (US); Kaushik Bhattacharya, Pasadena, CA (US); Kaushik Dayal, Minneapolis, MN (US); Matthew Dicken, Pasadena, CA (US); Demetri Psaltis, Pasadena, CA (US); Axel Scherer, Laguna Beach, CA (US); Guruswami Ravichandran, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/497,935

(22) Filed: Aug. 1, 2006

(65) Prior Publication Data

US 2008/0019648 A1    Jan. 24, 2008

Related U.S. Application Data

(60) Provisional application No. 60/704,359, filed on Aug. 1, 2005.

(51) Int. Cl.
*G02B 6/00* (2006.01)
(52) U.S. Cl. ..................................... 385/122
(58) Field of Classification Search ............... 359/321, 359/341.1; 252/584; 385/122
See application file for complete search history.

(56) References Cited

U.S. PATENT DOCUMENTS

2002/0074537 A1    6/2002    John et al.

2004/0190117 A1    9/2004    Kubaink
2004/0218257 A1    11/2004    Chen et al.

FOREIGN PATENT DOCUMENTS

EP       1341010 A2    9/2003

OTHER PUBLICATIONS

PCT International Search Report dated Jan. 12, 2007, and received in connection with foreign counterpart application PCT/US2006/030270.

*Primary Examiner*—Quyen P Leung
(74) *Attorney, Agent, or Firm*—Joseph B. Milstein; Hiscock & Barclay, LLP

(57) ABSTRACT

Systems and methods for manipulating light with tunable ferroelectric photonic devices. Devices having tunable properties that exhibit photonic bandgap behavior are fabricated from ferroelectric materials. Apparatus is provided to apply tuning signals to the ferroelectric material using one or more of electric fields, mechanical forces, optical fields, and thermal fields. Control circuitry is provided to generate the control signals needed to apply the tuning signals. Input and output ports are provided to allow input signals to be received and to provide output signals. In some cases, a feedback loop is provided to use a portion of the output signal as a diagnostic signal for control of the operation of the device within an acceptable range. It is expected that ferroelectric photonic devices operating according to principles of the invention will be useful for a wide variety of applications, including optical switching, optical modulation, optical computing, and performing logic optically.

20 Claims, 14 Drawing Sheets

SWITCHABLE REFLECTORS

SWITCHABLE WAVEGUIDES

MACH-ZEHNDER INTERFEROMETER

PHOTONIC PROBE OF
ELECTRO-MECHANICAL
DOMAIN SWITCHING

FERROELECTRIC NANOPHOTONIC MATERIALS AND DEVICES

CROSS-REFERENCE TO RELATED APPLICATIONS

This application claims priority to and the benefit of co-pending U.S. provisional patent application Ser. No. 60/704,359, filed Aug. 1, 2005, which application is incorporated herein by reference in its entirety.

STATEMENT REGARDING FEDERALLY FUNDED RESEARCH OR DEVELOPMENT

The invention described herein was made in the performance of work under Department of the Army Grant No. DAAD19-01-1-0517, and is subject to the provisions of Public Law 96-517 (35 U.S.C. §202) in which the Contractor has elected to retain title.

FIELD OF THE INVENTION

This invention relates to tunable optical and photonic devices fabricated from ferroelectric and other active materials whose optical properties can be statically and dynamically tuned and switched using one or more of a mechanical, an electrical, an optical and a thermal stimulus. In particular, this invention relates to optical waveguides, resonators, and photonic crystals that can be statically and dynamically tuned.

BACKGROUND OF THE INVENTION

Since the 16$^{th}$ century, the design of optical components has centered on homogenous dielectric media. Such optical components are limited by the achievable wave vectors and dispersion relations at optical frequencies in the medium. This is severely limiting since the refractive indices of typical dielectric materials are both modest and essentially constant below their optical gaps. This limitation has been overcome in the last decade through the development of photonic devices in heterogeneous materials including waveguides, resonators and photonic crystals.

Photonic crystals are artificially fabricated structures, typically made of a dielectric material, such as glass or silicon, and typically containing a periodic array of holes. Photonic crystals were first described by Yablonovitch in 1987 and were first constructed by mechanically drilling holes in ceramic blocks. The propagation of electromagnetic radiation, such as light, through such a heterogeneous periodic medium is quite complicated, especially when the wave-length becomes comparable to the periodicity of the structure. The propagation of the electromagnetic radiation can be described using a dispersion relation that relates the frequency to the wave-number. The dispersion relation depends on both the refractive index and also the geometry. The slope of the dispersion curve gives the group velocity, i.e., the effective velocity with which electromagnetic energy propagates in this medium. In photonic crystals the group velocity can become very small and even zero. Furthermore, a periodic array of materials with different indices of refraction gives rise to forbidden frequencies of light known as the optical or photonic band-gap ("PBG"). The photonic crystal acts as a reflector for light of those frequencies. Finally, by putting in defects wherein one deviates from periodicity in selected regions, one can build a number of interesting devices such as resonant cavities and lasers.

Photonic crystals are nanofabricated two- and three-dimensional periodic structures in glass and semiconductors that allow one to design or to engineer the dispersion relation of the medium. They can be designed with well-defined photonic bandgaps, which are frequency bands within which the propagation of electromagnetic waves is forbidden irrespective of the propagation direction in space and polarization of the incoming light. When combined with high index contrast slabs in which light can be efficiently guided, nanofabricated two-dimensional photonic bandgap mirrors can be fabricated to confine and concentrate light into extremely small volumes and to obtain very high field intensities that enable a variety of applications. Fabrication of optical structures has evolved to a precision that allows the control of light within etched nanostructures. As one example, nanofabricated high reflectivity mirrors can be used to define high-Q cavities in Vertical Cavity Surface Emitting Lasers (VCSELs). For example, room temperature lasing in the smallest optical cavities with mode volumes down to 2.5 $(\lambda/2/n_{slab})^3$, or 0.03 $\mu m^3$ in InGaAsP emitting at 1.55 $\mu m$ have been demonstrated. As the mode volumes of nano-cavities are decreased, the coupling efficiency between the spontaneous emission within the cavity and the lasing mode can be significantly improved. Furthermore, sub-wavelength nano-optic cavities can be used for efficient and flexible control over both emission wavelength and frequency.

Photonic crystal waveguides play a crucial role in photonic crystal integrated circuits. These waveguides are responsible for transferring light throughout the integrated circuit as well as for the coupling of light into and out of the integrated circuit. At ~1.5 $\mu m$ wavelengths, it is possible to use silicon as a low-absorption waveguide material, and to leverage upon the extensive fabrication and wafer preparation experience of the microelectronics industry. In particular, semiconductor on insulator (SOI) structures lend themselves well to fabrication of single mode waveguides from high index silicon and the fabrication of passive two-dimensional ("2-D") photonic crystal structures. When designed properly, a semiconductor on insulator layer can serve as a high index optical waveguide, and can be patterned to define 2-D PBG material.

Although photonic crystals and photonic devices are currently fabricated, they are static structures. They possess the dispersion relation and characteristics that exist when they are fabricated.

A variety of materials exhibit ferroelectricity including perovskites with the composition $ABO_3$, where A and B are suitable metals. A few common examples are barium titanate ($BaTiO_3$), lead titanate ($PbTiO_3$) and lithium niobate ($LiNbO_3$). Ferroelectric materials exhibit spontaneous polarization and form domain patterns that can be switched through applied fields, such as electrical, optical and mechanical fields. They possess high refractive index and birefringence that can be tuned through the application of electric fields. $BaTiO_3$ is non-polar and cubic above its Curie temperature of 403 K, but is spontaneously electrically polarized along a <100> cubic direction and is spontaneously distorted into a tetragonal symmetry below the Curie temperature. The reduction in symmetry at its phase transition means that the ferroelectric can exist in six equivalent forms or variants below the Curie temperature. A typical crystal contains a mixture of variants with domains of one variant separated from the other by domain walls. The domain pattern can be changed by the application of electric field and stress as one variant switches to another. This material is a nonlinear anisotropic dielectric at room temperature.

Ferroelectric perovskites like barium titanate display the electro-optic effect wherein the refractive index can be changed through the application of electric field. This electrical-optical coupling has two sources. The first is the intrinsic electro-optic coupling (that with fixed domain pattern) under moderate fields, and the second is an extrinsic electro-optic coupling (that associated with changing domain patterns) under sufficiently high fields (above the coercive field). The latter is a consequence of the fact that ferroelectric perovskites are birefringent materials, in which the refractive index in the direction of the spontaneous polarization is different from the refractive index in a direction perpendicular to the spontaneous polarization. When the domains are switched through the application of electric field, the direction of spontaneous polarization and consequently the refractive index also changes.

Ferroelectric perovskites like barium titanate are also wide-band gap semiconductors and display the photorefractive effect that can be influenced by doping. When illuminated with light in the visible spectrum, charges are excited into the conduction band from traps in the crystal. These charges can diffuse away from the point of excitation before they are retrapped. When there is a gradient in the illumination pattern, this process can establish space charge fields with charges accumulating in the darker regions. The presence of the electric field modulates the index of refraction of the material which in turn modulates light incident on the crystal. This mechanism is known as electrical fixing, and can be used to permanently store holograms recorded via the photorefractive effect. The same internal fields can also be used to locally align the domains of the crystal. Typically, a strong external field is applied and the internal photorefractive field either adds or subtracts from it to cause the domains to flip.

High-quality bulk crystals of $LiNbO_3$ can be synthesized. The modulation of the refractive index via the $3^{rd}$ order nonlinear optical coefficient using DC electric fields has led to the development of commercial high speed (10-40 Gb/sec) electro-optic modulators formed as diffused waveguides in bulk $LiNbO_3$. However, these modulators offer very limited tunability. These devices are limited in their capabilities and necessarily are fabricated at the millimeter scale or larger.

There is a need for apparatus that can manipulate light, that can be small enough to allow fabrication of the analog of integrated circuits, and that can operate in a tunable fashion.

SUMMARY OF THE INVENTION

In one aspect, the invention relates to a photonic bandgap light manipulation apparatus having a tunable property. The apparatus comprises a photonic bandgap structure having a dispersion relation, the photonic bandgap structure comprising a ferroelectric material, the photonic bandgap structure having at least one of an optical input port for receiving an optical input signal and an optical output port for providing an optical output signal; a control circuit that controls an application of a tuning signal to the ferroelectric material; and at least one structure operatively connected to the ferroelectric material and to the control circuit, the at least one structure configured to apply the tuning signal to the ferroelectric material. The property of the photonic bandgap light manipulation apparatus is tuned to provide a manipulation of at least one of the optical input signal that is received at the apparatus at the optical input port and the optical output signal that is provided by the apparatus at the optical output port.

In one embodiment, the manipulation of light is a switching operation. In one embodiment, the manipulation of light is a logic operation. In one embodiment, the manipulation of light is a modulation of light. In one embodiment, the manipulation of light is a memory operation. In one embodiment, the manipulation of light is a computation operation. In one embodiment, the manipulation of light involves controlling a propagation direction of a beam of light.

In one embodiment, the tuning signal is an electrical signal. In one embodiment, the tuning signal is a mechanical force. In one embodiment, the tuning signal is an optical signal. In one embodiment, the tuning signal is a thermal signal.

In one embodiment, the at least one structure configured to apply the tuning signal to the ferroelectric material is an electrode. In one embodiment, the electrode comprises a metal. In one embodiment, the electrode comprises an oxide. In one embodiment, the electrode comprises a carbon nanotube. In one embodiment, the electrode comprises a doped semiconductor.

In one embodiment, the at least one structure configured to apply the tuning signal to the ferroelectric material is a mechanical device. In one embodiment, the at least one structure configured to apply the tuning signal to the ferroelectric material is an optical source.

In one embodiment, the photonic bandgap light manipulation apparatus further comprises a feedback loop that includes a detector that receives an output signal from the apparatus and provides a signal in response to the received signal to the control circuit.

In one embodiment, the photonic bandgap light manipulation apparatus further comprises a power supply that provides power to at least one of the control circuit and the at least one structure configured to apply the tuning signal to the ferroelectric material.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
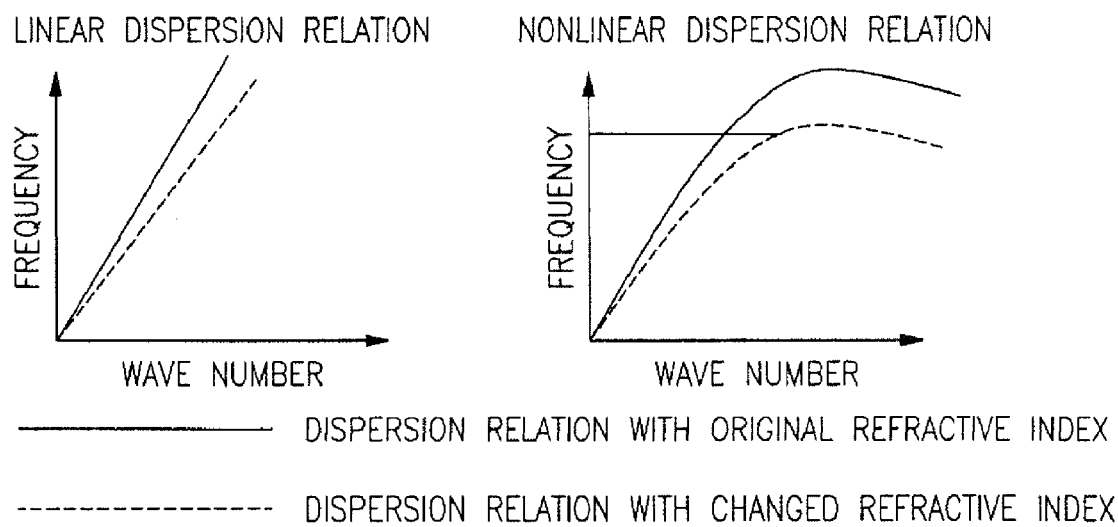
FIG. 1 is a drawing showing the dispersion relation in two exemplary materials.

For convenience of exposition, we will use the term ferroelectric photonic crystal to denote a structure having the properties of a photonic crystal that is constructed from a ferroelectric material. A ferroelectric photonic crystal is one embodiment of a material that can be used to make ferroelectric photonic devices. These materials and devices are often described using the prefix "nano" because such materials and devices are fabricated with dimensions of the order of wavelengths of light, e.g., nanometer dimensions. The invention involves the fabrication and operation of ferroelectric nanophotonic materials and devices. These materials and devices combine the geometric features of photonic crystals with the inherent material properties of ferroelectric materials to obtain unprecedented ability to manipulate light. The nonlinear optical interactions in ferroelectric photonic devices allow the application of these interactions to make compact all optical switches and modulators. It is expected that such devices will have a significant technological impact on optical communications and sensor technology.

According to principles of the invention, a device uses either the nonlinear optical properties or the electro-optic-mechanical coupling features of ferroelectric materials to provide a way to actively tune the dispersion relation of photonic crystals and photonic devices. Tuning the dispersion relation can provide a mechanism to cause an individual device to become active or inactive at a specified wavelength, as may be desired. By controlling the behavior of at least one individual device, one can cause a device, and a circuit containing the device, to change a mode of operation, for example from one of transmission, reflection, or extinction of light at a given frequency or wavelength to another mode. Devices that change a mode of operation can be employed to provide such functions as switching (change of state) and memory (persistence of state). Such devices can be controlled to create logic gates, to provide computational capability, to control optical signals and the paths such signals follow, and to provide other useful functionality. According to principles of the invention, the apparatus, systems and method of the invention provide waveguides, resonators and photonic devices whose properties can be statically and dynamically tuned.

This new capability will allow the reduction of the size of optical components. Miniature components make possible their integration in large numbers; much in the same way electronic components have been integrated for improved functionality to form electronic microchips. In addition, methods of fabricating the materials and apparatus of the invention provide the capability to produce integrated devices comprising pluralities of individual devices. Depending on the selection of materials that are used as substrates upon which such devices are fabricated or assembled, the possibility of having an integrated structure that includes both optical and electrical signal manipulation can be envisioned.

The switchable electrical and optical properties of ferroelectric materials will be utilized to fabricate optical devices with tunable properties. Optical constants in perovskite materials vary with crystal orientation and applied electric field. Mechanical and electrical switching of ferroelectric domains leads to tunable optical properties. Controlling birefringence and electrooptic response will lead to waveguides, photonic crystals, and resonators with a wide range of variable properties. Waveguides utilizing ferroelectric thin films will be used in interferometric devices to create optical switches. Ferroelectric photonic crystal resonators and waveguides having tunability will provide devices capable of variable cavity resonant frequency, switchable Bragg reflectors, and others. Ring resonators fabricated from ferroelectric thin films will similarly demonstrate optical tunability.

The materials, devices, systems and methods of the invention combine control of dispersion relations with nonlinear optical properties of active materials to create tunable and switchable optoelectronic devices including waveguides, resonators, lasers and modulators.

A dispersion relation is the relation between the wavelength and wave number of light propagating in the medium. The slope of the dispersion relation is group velocity and describes the speed with which light (specifically energy associated with the light) propagates through a medium. A linear dispersion relation means light of all frequencies propagate with the same velocity, while a nonlinear dispersion relation means that light of different velocities propagate at different speeds. Further, a bandgap in the dispersion relation indicates that light with some frequencies do not propagate in the medium.

FIG. 1 is a drawing showing the dispersion relation in two exemplary materials. The dispersion relation of a medium depends on the refractive index of the medium. A change in the refractive index changes the dispersion relation and the group velocity. Consider a medium with linear dispersion relation shown on the left of FIG. 1. It has a linear dispersion relation shown by the solid line. If one changes its refractive index slightly, as shown by the dotted line, the material exhibits a different dispersion relation. Note that the slope changes, but very slightly, and that the slope is constant as a function of wave number. Now consider a medium with nonlinear dispersion relation, such as is shown on the right of FIG. 1. When the refractive index is changed as before, one observes that the slope changes dramatically at wave numbers or frequencies where the slope is small. Therefore a nonlinear dispersion relation is a means of magnifying changes in refractive index. Conversely, changes in refractive index are a means of tuning dispersion relations.

The materials, devices, systems and methods of the invention take advantage of this principle by combining two elements, a device with engineered dispersion relation and a material with tunable refractive index. In order to tune or modify the dispersion relation, one can apply a tuning signal, for example by applying at least one of an electrical field, a mechanical force (a stress or a strain), an optical field, or a thermal field. One can choose various options for each element as described below.

This invention can be embodied in various devices. A few examples are described here.

Figure 2:
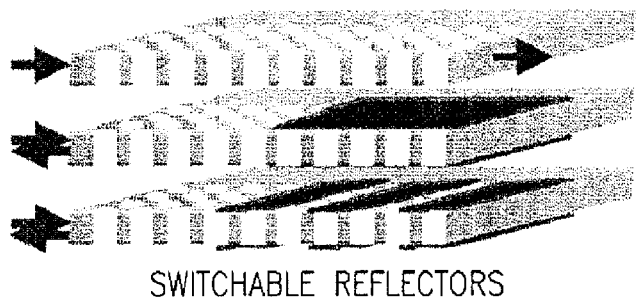
FIG. 2 is a schematic diagram showing various states of a switchable mirror, according to principles of the invention.

FIG. 2 is a schematic diagram showing various states of a switchable mirror. In the topmost layer of FIG. 2 light at the band edge is propagating through a photonic structure, as indicated by the arrow entering the layer on the left, and exiting the layer on the right. In the middle layer light is introduced on the left. An applied electric field changes the band-gap in part of the structure (the region on the right of the middle layer) so that the propagating light is in the band-gap and is therefore forbidden to pass through the region having the modified band gap. This structure now acts as a mirror, and the light exits on the left, as indicated by the second arrow. Further, the structure can be switched back and forth between the transmitting and a reflecting state. In another embodiment the switching is done in a segmented manner, as indicated by the structure shown in the lowest layer of FIG. 2, so that one obtains a reflector where the reflected light has a different frequency from the incoming light.

Figure 3:
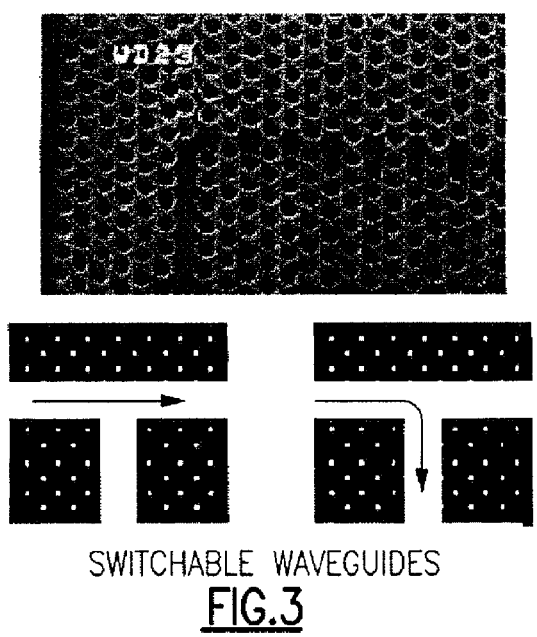
FIG. 3 is a schematic diagram of an exemplary switchable waveguide, according to principles of the invention.

Another exemplary device is a switchable waveguide, as indicated in schematic form in FIG. 3. One can create a waveguide in a photonic crystal by using an array of defects. It has been explained in the literature that a defect, or a deliberately added distortion of the regular pattern that adheres in a photonic bandgap material, can act in a manner similar to a dopant atom in a semiconductor, to modify the optical property of the photonic bandgap material locally. In the current invention, one can create two arrays of defect with slightly different structure. In such an embodiment, the light is guided along one defect in the presence of an electrical field and along another in its absence. It is also known to make optical cavities, for example for use in lasers, by introducing defects into a photonic bandgap material.

Figure 4:
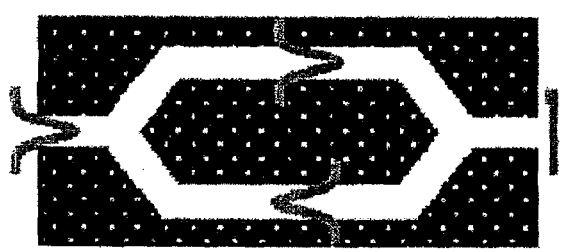
FIG. 4 is a schematic diagram of a simple Mach-Zehnder interferometer, according to principles of the invention.

FIG. 4 is a schematic diagram of a simple Mach-Zehnder interferometer. However, since this is fabricated in a photonic device where the group velocity is very small, and since the modulation is done by electrically induced changes of refractive index, the device can be made at sizes orders of magnitude smaller than regular devices.

Figure 5:
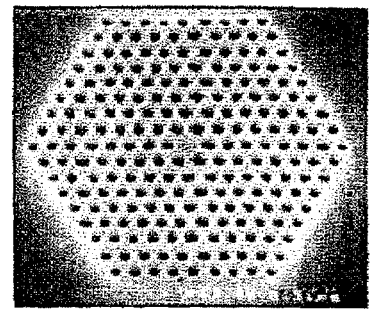
FIG. 5 is a diagram showing a tunable laser cavity, according to principles of the invention.

FIG. 5 is a diagram showing a tunable laser cavity. Here a defect (the filled opening in the very center of the otherwise periodic hexagonal array of holes) is used to confine light and thus act as a laser. Lasers fabricated laser cavity structures that are not tunable after fabrication, so that the laser operates at a single fixed wavelength, are well known and have been described in the literature. See, for example, J O'Brien, 0 Painter, R Lee, C C Cheng, A Yariv, and A Scherer, "Lasers incorporating 2D photonic bandgap mirrors", *Electronics Letters,* 32(24):2243-2244 (1996). In various embodiments of the present invention, an application of electric field, mechanical stress or gate illumination can be used to tune the refractive index of the photonic bandgap structure, thus changing the lasing frequency.

Figure 6:
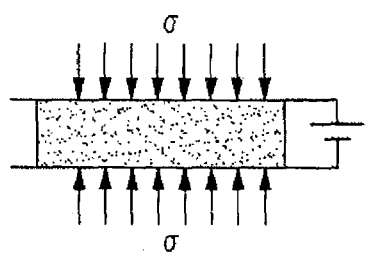
FIG. 6 is a schematic diagram of a structure that can be used to study the properties of materials, using the principles of the invention.

FIG. 6 is a schematic diagram of a structure that can be used to study the properties of materials, using the principles of the invention. A photonic structure is used to confine light into very small volumes so that one has light-induced domain switching in ferroelectric materials. This kind of structure can be used as a probe for the properties of the ferroelectric material itself. Viewed in another way, the structure shown in schematic in FIG. 6 can be used as a kind of memory device, in which a first behavior of light as it passes interacts with the material represents a first state (for example a zero), and a second behavior of light as it interacts with the material represents a second state (for example a one). By applying deliberate electrical fields to regions of a material, a plurality of memory elements can be fabricated and operated. In this kind of memory, it is believed that there may additionally be the possibility of having more than two response states for a given input signal (e.g., transmission, reflection of light at a first wavelength, reflection of light at a second wavelength or reflection of light at a third wavelength), thereby constructing memory elements having a high data storage density than a comparable memory element having only two states.

Figure 7:
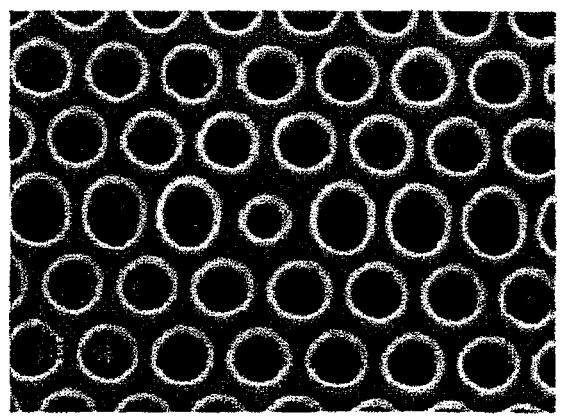
FIG. 7 is an image of a ferroelectric photonic crystal etched in 200 nm thick LiNbO$_3$ single crystal thin film on SiO$_2$/Si fabricated by layer transfer, according to principles of the invention.

FIG. 7 is an image of a ferroelectric photonic crystal etched in 200 nm thick $LiNbO_3$ single crystal thin film on $SiO_2$/Si fabricated by layer transfer. The pattern transfer was produced by focused ion beam milling.

We now turn to a more detailed discussion of the materials devices, systems and methods that embody the invention. In various embodiments, the device with an engineered or controlled dispersion relation can be a photonic crystal (described in greater detail below in section I-1), a surface plasma polarization device (described in greater detail below in section I-2), an engineered domain pattern (described in greater detail below in section I-3) or a compositionally graded material (described in greater detail below in section I-4). A photonic crystal is a nano-fabricated one, two or three dimensional structure. It can be fabricated by electron-beam lithography, optical lithography, focused ion beam milling or self-assembly. A surface plasma polarization device is a device with patterned surfaces. An engineered domain pattern is a ferroelectric material with pinned domains. Compositionally-graded materials can be materials in which a change in composition along at least one axial direction is generated by producing materials having graded chemical compositions, for example by depositing layers having controlled chemical composition. Examples of compositionally graded materials are strained layer superlattices, and materials with graded doping.

The active material (II) must have optical properties which can be altered through the application of light, electric field or mechanical stress (described in greater detail below in section II-1). These properties include the electro-optic effect (described in greater detail below in section II-1-1) which can either be obtained using domain switching or can be inherent to the material, the photorefractive effect (described in greater detail below in section II-1-2) or a strain induced modulation of refractive index (described in greater detail below in section II-1-3). These properties are available in a variety of materials (described in greater detail below in section II-2) including perovskites with composition $ABO_3$ and liquid crystal elastomers. Finally, the synthesis (described in greater detail below in section II-3) of these materials can be performed by a variety of means including pulsed laser deposition (described in greater detail below in section II-3-1), chemical vapor deposition (described in greater detail below in section II-3-2), molecular beam epitaxy (described in greater detail below in section II-3-3) and layer transfer (described in greater detail below in section II-3-4).

In various embodiments, the device includes a means of applying the tuning field (described in greater detail below in section III). This tuning may be achieved using electrical fields applied using planar electrodes (described in greater detail below in section III-1), interdigitated or otherwise patterned electrodes (described in greater detail below in section III-2). In some embodiments, the electrodes may be a combination of such electrodes. The tuning may also be achieved using mechanical means using a mechanical loading device (III-3). In some embodiments, tuning is achieved optically, by the application of light and a photorefractive material (described in greater detail below in section III-4). The tuning fields may be applied uniformly across the device or in a spatially varying manner. The tuning fields may be applied either statically or dynamically. The tuning may be controlled manually, by application of a predefined signal or by using a digital controller system (described in greater detail below in section III-5). The various tuning fields may also require a power supply (described in greater detail below in section III-6). In some embodiments, after the tuning field has been applied, the effect of the tuning field may be fixed in the tuned medium. In the case of tuning by application of an electrical field, the structure used to tune the material may be considered to be the equivalent of a capacitor, in which charges are applied to specifically designed plates so as to apply a desired field across the tunable medium. One the charge that is necessary to obtain the desired tuning is applied, one or more of the capacitor plates can be disconnected from a power supply, or otherwise insulated, so that the charge applied is effectively trapped or fixed on the capacitor plates. Such operation can provide a persistent tuned state, which can be used as a memory element. In addition, because energy and power are expended only during the time that charge is flowing into or out of the capacitor, such a device can be very energy efficient.

In some embodiments, the device includes a means of coupling light into it (described in greater detail below in section IV). In various embodiments, the light coupling can be achieved through gratings (described in greater detail below in section IV-1), prism coupling (described in greater detail below in section IV-2), tapered fiber coupling (described in greater detail below in section IV-3), butt coupling (described in greater detail below in section IV-4) and plasmon coupling (described in greater detail below in section IV-5).

In some embodiments, the device can be designed to operate under various mode confinement regimes (described in greater detail below in section V). These include planar ferroelectric core (described in greater detail below in section V-1), planar SOI/ferroelectric core (described in greater detail below in section V-2), planar plasmon/ferroelectric core (described in greater detail below in section V-3) and three dimensional ferroelectric modes (described in greater detail below in section V-4).

I Dispersion Control

Dispersion control is accomplished by providing a device or a substance that permits alteration of a dispersion relation, and additionally providing a system or a method that permits the deliberate modification of the dispersion relation. In one embodiment, the material or substance is a photonic crystal constructed from a ferroelectric material, and the system or method that permits the deliberate modification of the dispersion relation is a system that allows the deliberate application of an electrical field, the deliberate application of an optical field, or the deliberate application of a mechanical force, that modifies the properties of the material, such as its polarization state, at least one of its physical dimensions, or its domain structure so as to change a dispersion relation, thereby tuning the material behavior in a desired manner so that a desired condition is provided. In other embodiments, the material is a liquid crystal elastomer, and the system or method that allows modification of the material properties is one or more of an applied electrical field, a mechanical force, and a thermal field.

I-1 Photonic Crystal

I-1.1 Fabrication

Nanofabricated Photonic Crystals

Photonic crystals are nanofabricated two- and three-dimensional periodic structures, commonly constructed in glass and semiconductors, although many other materials can in principle be used. They can be designed with well-defined photonic bandgaps. A three dimensional photonic bandgap is a frequency band within which the propagation of electromagnetic waves is forbidden irrespective of the propagation direction in space and polarization of the incoming light. When combined with high index contrast slabs or other structures in which light can be efficiently guided, nanofabricated two-dimensional photonic bandgap mirrors can confine and concentrate light into extremely small volumes and can produce very high field intensities that enable a variety of applications. High accuracy nanofabrication techniques and the development of finite-difference time-domain (FDTD) simulations can be used to produce reliable device designs.

Figure 8:
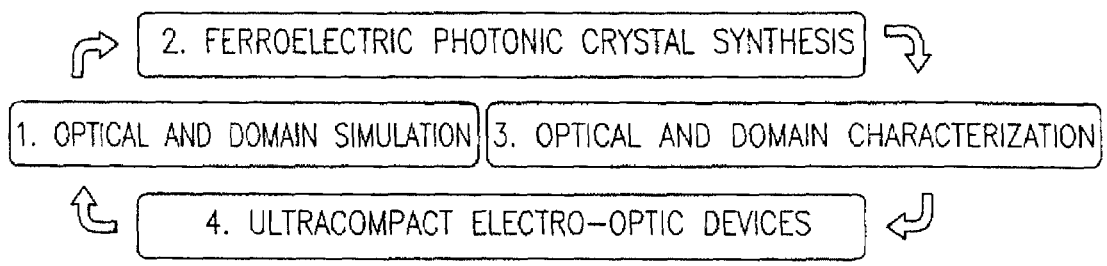
FIG. 8 is a diagram that shows the relationship among the steps of a process by which such ferroelectric photonic materials and devices can be designed, fabricated, and analyzed or characterized.

FIG. 8 is a diagram that shows the relationship among the steps of a process by which such ferroelectric photonic materials and devices can be designed, fabricated, and analyzed or characterized. The process can be iterative. For purposes of exposition, one of the steps is selected arbitrarily as a first step. The steps include simulation or theoretical analysis of the interactions of domains in ferroelectric materials with light, synthesis of desired structures having photonic crystal geometry made in ferroelectric material, characterization of the interactions of domains in ferroelectric materials with light; and design and construction of electro-optic devices that employ the properties of the ferroelectric photonic crystal material.

Photonic Cavity Devices

Figure 9:
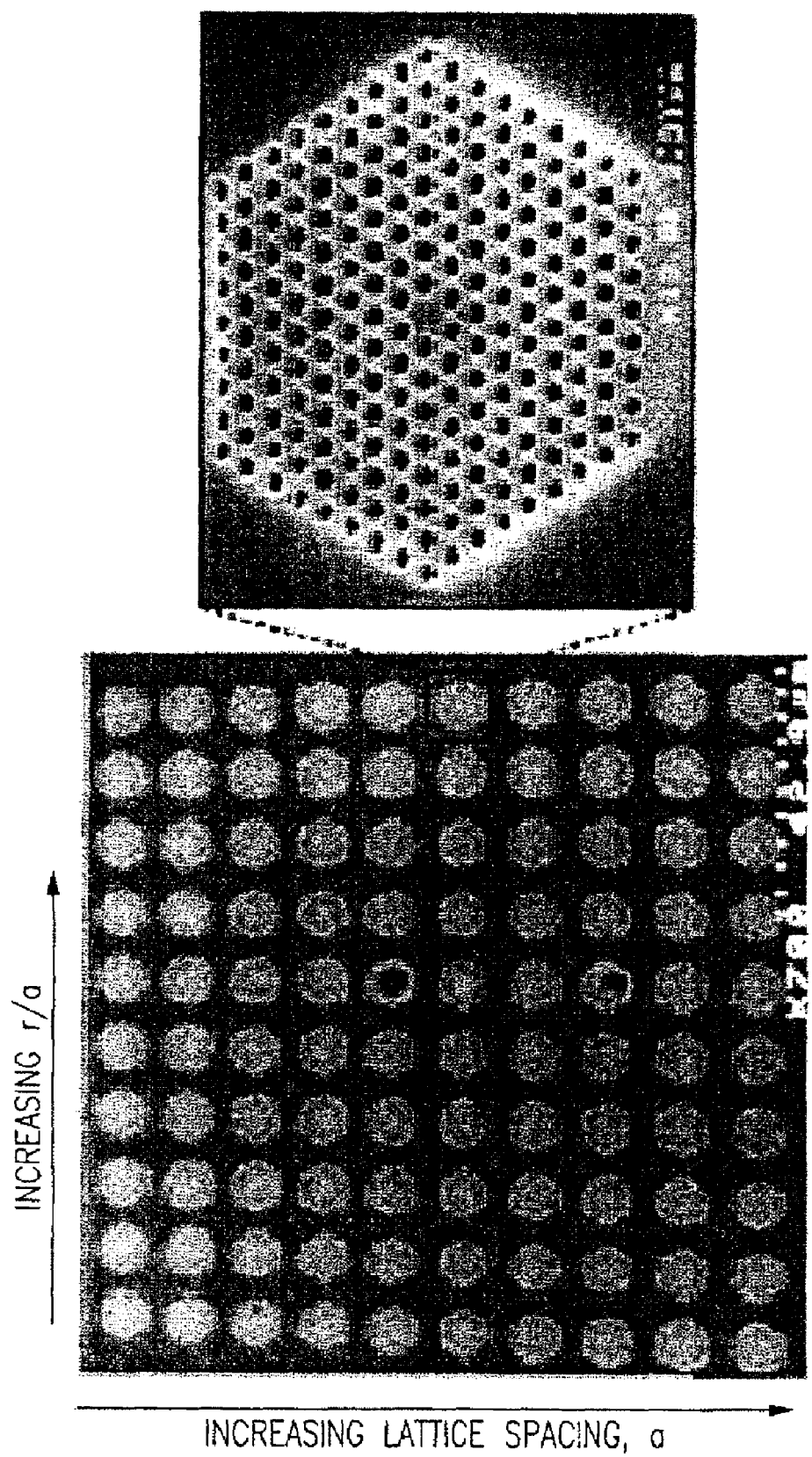
FIG. 9 is an image that shows, on the left, an example of a 10×10 array of laser cavities tuned to different individual fixed wavelengths, each wavelength being controlled by the dimensions of the features of an individual cavity.

Fabrication of optical structures has evolved to a precision that allows the control of light within etched nanostructures. For example, nanofabricated high reflectivity mirrors can be used to define high-Q cavities in Vertical Cavity Surface Emitting Lasers (VCSELs). As has been demonstrated by one of us, and as reported in the technical literature, one can make structures that exhibit room temperature lasing in the smallest optical cavities, with mode volumes down to 2.5 $(\lambda/2n_{slab})^3$, or 0.03 $\mu m^3$ in InGaAsP emitting at 1.55 $\mu m$. As the mode volumes of nano-cavities are decreased, the coupling efficiency between the spontaneous emission within the cavity and the lasing mode can be significantly improved. Further, sub-wavelength nano-optic cavities can be used for efficient and flexible control over both emission wavelength and frequency. We have shown that one can design the emission wavelength of these lasers to be at a desired wavelength in the range from 1450 nm to 1620 nm within a 10×10 laser array in an area of 100 $\mu m$×100 $\mu m$ by local lithographic modification of the cavity lengths. FIG. 9 is an image that shows, on the left, an example of a 10×10 array of laser cavities tuned to different individual fixed wavelengths, each wavelength being controlled by the dimensions of the features of an individual cavity. On the right of FIG. 9 there is shown in greater detail the hexagonal structure of a single cavity, with a "defect" (e.g., a filled aperture) at the center of the array. In this example, it is demonstrated that single mode lasers emitting at 1450 nm can be fabricated only microns apart from lasers emitting at 1600 nm, and could share the same waveguide slab.

Figure 10:
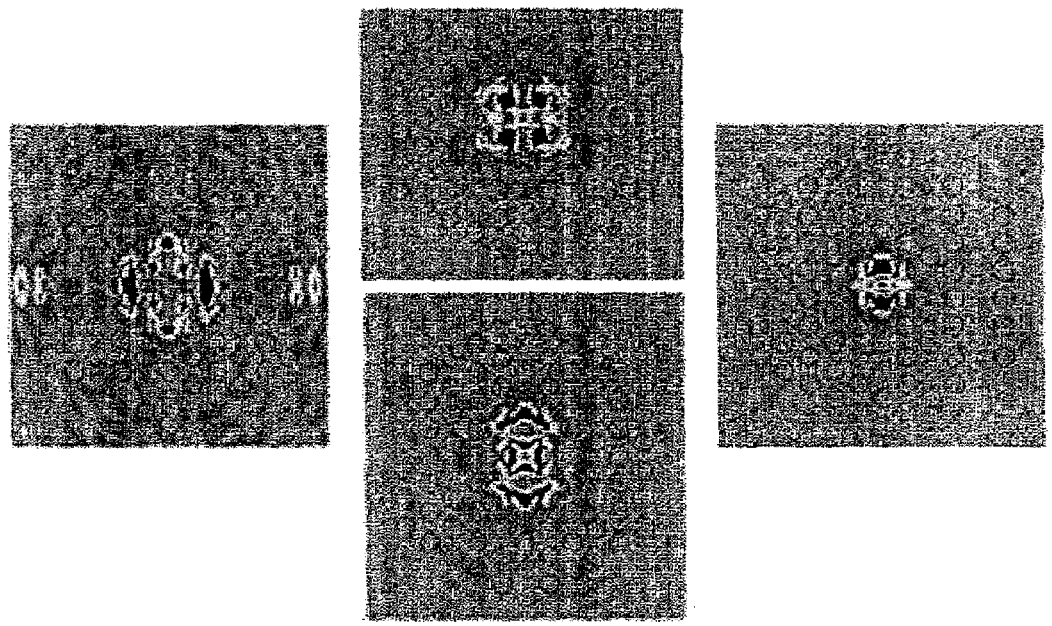
FIG. 10 is a diagram that shows an example of a single defect photonic crystal cavity, which supports both shallow acceptor modes as well as deep donor modes within the same cavity.
Figure 10:
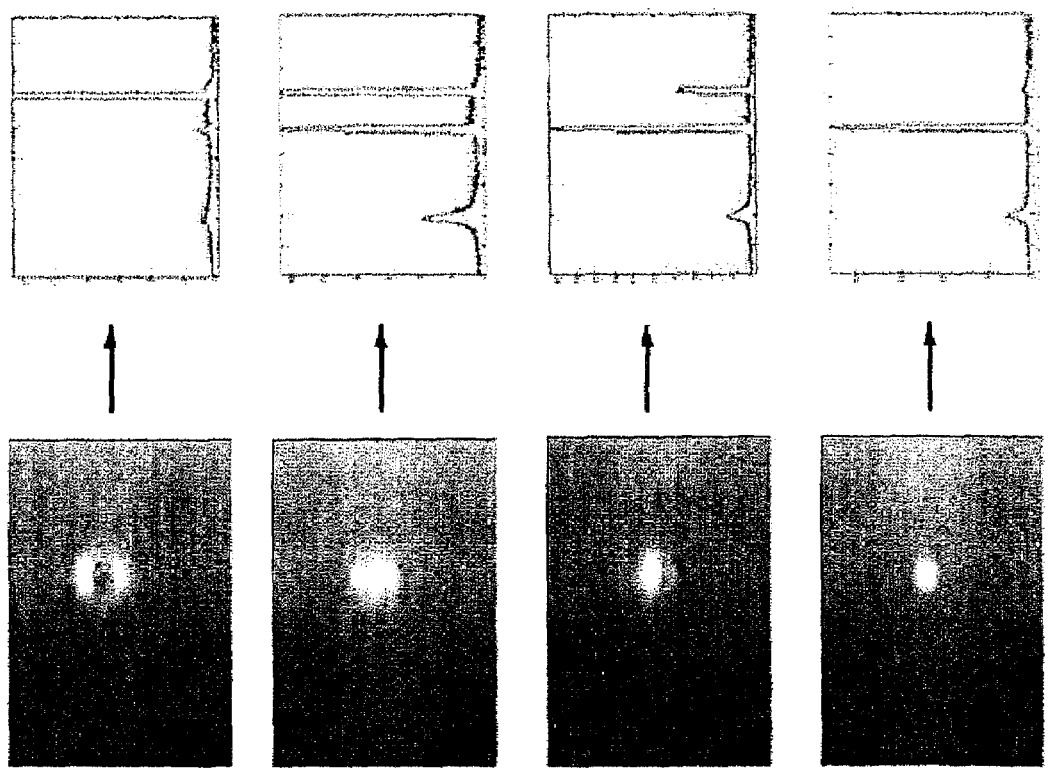

Another unique feature of active photonic crystal cavities, which arises from their ability to limit the number of modes supported within the laser, is the ability to build high contrast modulators. FIG. 10 is a diagram that shows an example of a single defect photonic crystal cavity, having fixed properties defined by the structure, which supports both shallow acceptor modes as well as deep donor modes within the same cavity. The left hand side of FIG. 10 shows the diameter of various pump beams. The central column of diagrams in FIG. 10 shows the spectra of the light emitted in relation to the size of the pump beams. The right hand side of FIG. 10 shows the results of finite-difference time-domain (FDTD) simulations of the expected geometric distribution of the field intensities of the exitation modes of the cavity. Depending on the diameter of the pump beam, we find that different modes are excited, and these in turn exhibit different spectra. The relative overlap of the pump beam with the expected mode geometries matches well to the observations.

Photonic Crystal Waveguides

Figure 11:
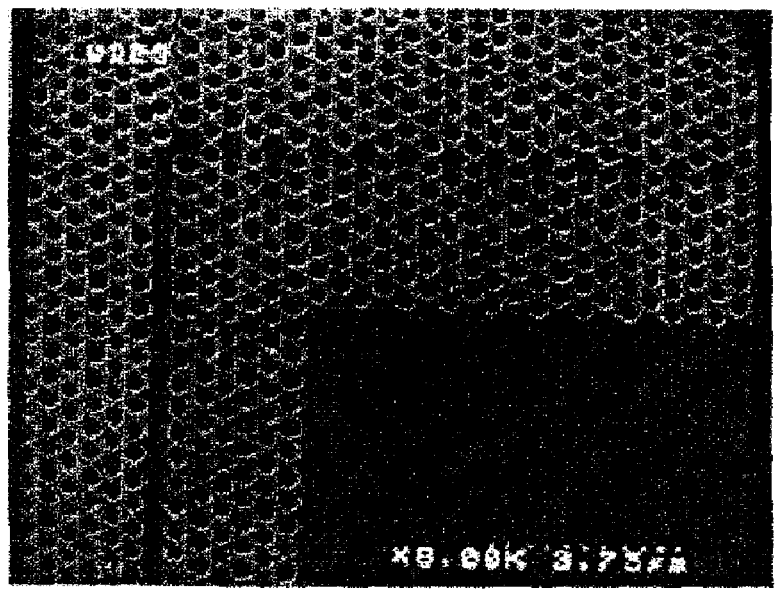
FIG. 11 is an image showing photonic crystal waveguides.
Figure 12:
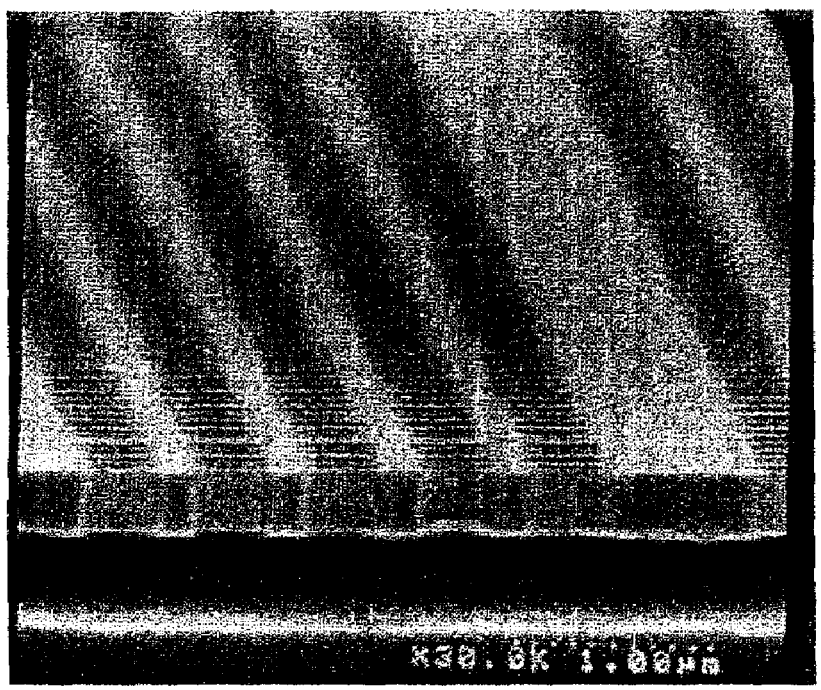
FIG. 12 is an image showing a suspended photonic waveguide fabricated in SOI silicon.

Photonic crystal waveguides like those shown in FIG. 11 play a crucial role in photonic crystal integrated circuits. These waveguides are responsible for transferring light throughout the integrated circuit as well as for the coupling of light into and out of the integrated circuit. At ~1.5 $\mu m$ wavelengths, it is possible to use silicon as a low-absorption waveguide material, and to leverage from the extensive fabrication and wafer preparation experience of the microelectronics industry. In particular, semiconductor on insulator (SOI) structures lend themselves well to fabrication of single mode waveguides from high index silicon and the fabrication of passive 2-D photonic crystal structures. When designed properly, this semiconductor on insulator layer can serve as a high index optical waveguide, and can be patterned to define 2-D PBG material. The ferroelectric film synthesis discussed herein closely resembles the SOI fabrication process yielding the ability to fabricate ferroelectric-on-insulator (FOI) waveguides similar to the silicon waveguides depicted in FIG. 12.

Ferroelectric Photonic Devices

FIG. 7 shows an example of one photonic crystal structure fabricated in ferroelectric $LiNbO_3$ that has been fabricated by us. It is expected that we will exploit the nonlinear properties of ferroelectric materials for fine-tuning of photonic crystal cavity devices enabling unprecedented cavity emission wavelength tuning via a combination of electrooptic tuning and state-of-the-art cavity fabrication. It is expected that we will exploit the nonlinear optical (photorefractive) properties of ferroelectrics, combined with optical soliton generation to create photonic crystal all-optical switches that can be used as all-optical logic gates for optical computing and information processing.

Photonic crystals enhance intrinsic nonlinearities and thereby substantially increase the possible functions that can be implemented in photonic crystal devices. Sub-wavelength high-Q cavities experience enhanced light intensities in the nonlinear material. Pluralities of such cavities coupled together using a photonic crystal waveguide, such as a coupled-resonator optical waveguide (CROW) are expected to be useful to increase the overall efficiency of the nonlinear optical processes. By the addition of carefully designed defects, it is expected that one can tune the group velocity of specific modes used in nonlinear optical excitation. Reducing the group velocity results in a longer interaction time, and provides a higher nonlinear and electrooptic efficiency without increasing the size of the device.

Electron Beam Lithography

Electron beam lithography is a well known method for fabricating device features at extremely fine resolution, with line widths that are measured in nm attainable. Because electron beam lithography is a "direct write" process, in which a pattern is exposed in a sequential manner as an electron beam is scanned across a surface of interest, the process can be slow. The process is commonly performed using resists that are exposed with the electron beam. The exposed resist is then developed and the surface (or material) upon which the pattern is provided is then further processed, using such methods as deposition processes, etching processes, metallization, and lift-off processes.

Optical Lithography

Optical lithography is a well known process in the semiconductor industry, in which masks (which themselves are often generated using electron beam lithography methods) are used to expose areas of photoresist (which can be either positive or negative photoresist). The exposed resist is then developed and the surface (or material) upon which the pattern is provided is then further processed, using such methods as deposition processes, etching processes, metallization, and lift-off processes.

Self Assembly

In some instances, such as the use of liquid crystal elastomers, the interactions between molecules, such as steric considerations, hydrogen bonding and van der Waals forces, as well as the energetics of rotations and bending in organic molecules, can lead to stable conformations, and to self-assembled structures. In some instances, for some kinds of molecules, it is possible to obtain self-assembled monolayers on specific substrates. It is known that liquid crystals can be provided in devices such as liquid crystal displays (LCDs) in which deliberately applied electric fields cause the liquid crystals to attain ordered states that interact with light.

I-2 Surface Plasma Polarization Device

Surface plasma polarization waves or plasmons are electromagnetic excitations that propagate along metal-dielectric interfaces or chains of metallic nanoparticles. It is possible to make a photonic bandgap device by using a ferroelectric material as the dielectric medium and patterning the metal in contact with it. This can be achieved variously. In one embodiment, it is expected that one can deposit metal in a periodic array on top of a ferroelectric material. In another embodiment, it is expected that one can deposit the metal as a thin film and use one of the lithographic techniques described above to pattern this metal.

I-3 Engineered Domain Pattern

Ferroelectric materials form domains patterns which are a complex arrangement of regions with different spontaneous polarization. Through the means by which the material is fabricated, by the application of proper electric field or by the application of proper mechanical loads, there are instances where the domain pattern can be engineered to be layered with a periodic arrangement of two or more spontaneous polarizations. This layered structure can be stabilized through the introduction of appropriate dopants or interdigitated electrodes. Since the refractive index depends on the polarization, such layered media act as a photonic bandgap material. This is not restricted to layered patterns. One can also have three dimensional engineered domain patterns.

I-4 Compositionally Graded Films

It is possible to make solid solutions of one or more ferroelectric materials. The solid solution of barium titanate and lead titanate is one example. In such instances, the refractive index of the medium depends on the composition of the solution. It is possible to synthesize materials where in the composition varies periodically giving rise to a photonic bandbap material.

II Active Materials

II-1 Properties

II-1-1 Electro-Optic Effect

The electro-optic effect describes the phenomenon by which the refractive index of a ferroelectric material can be changed through the application of an electric field. There are at least two manifestations of this phenomenon.

Small Signal Intrinsic

When a small to moderate electric field is applied to a ferroelectric medium, the intrinsic nonlinearity of the material causes the refractive index to change. This is usually described by the following equation $$\Delta n_{ij}(E) = -\frac{1}{2}n_{ij}^3(r_{ijk}E_k + s_{ijkl}E_kE_l)$$

where $n_{ij}$ is the refractive index, E is the electric field, $r_{ijk}$ is the electro-optic coefficient and $s_{ijkl}$ is the Kerr coefficient. This electro-optic coefficient is a material property and can either be positive or negative.

Domain Switching Extrinsic

When a large electric field is applied to ferroelectric material, the direction of spontaneous polarization can change in a process known as domain switching. Since ferroelectric materials are birefringent with the refractive index taking different values in the direction of polarization and a direction perpendicular to it, domain switching causes a change in refractive index. This can be described through the equation $$\Delta n = n_e - n_o$$

where $n_e$ is the extraordinary refractive index and $n_o$ is the ordinary refractive index. These are again properties of the material. Typically, the extrinsic electro-optic effect will be much larger than the intrinsic electro-optic effect.

Figure 13:
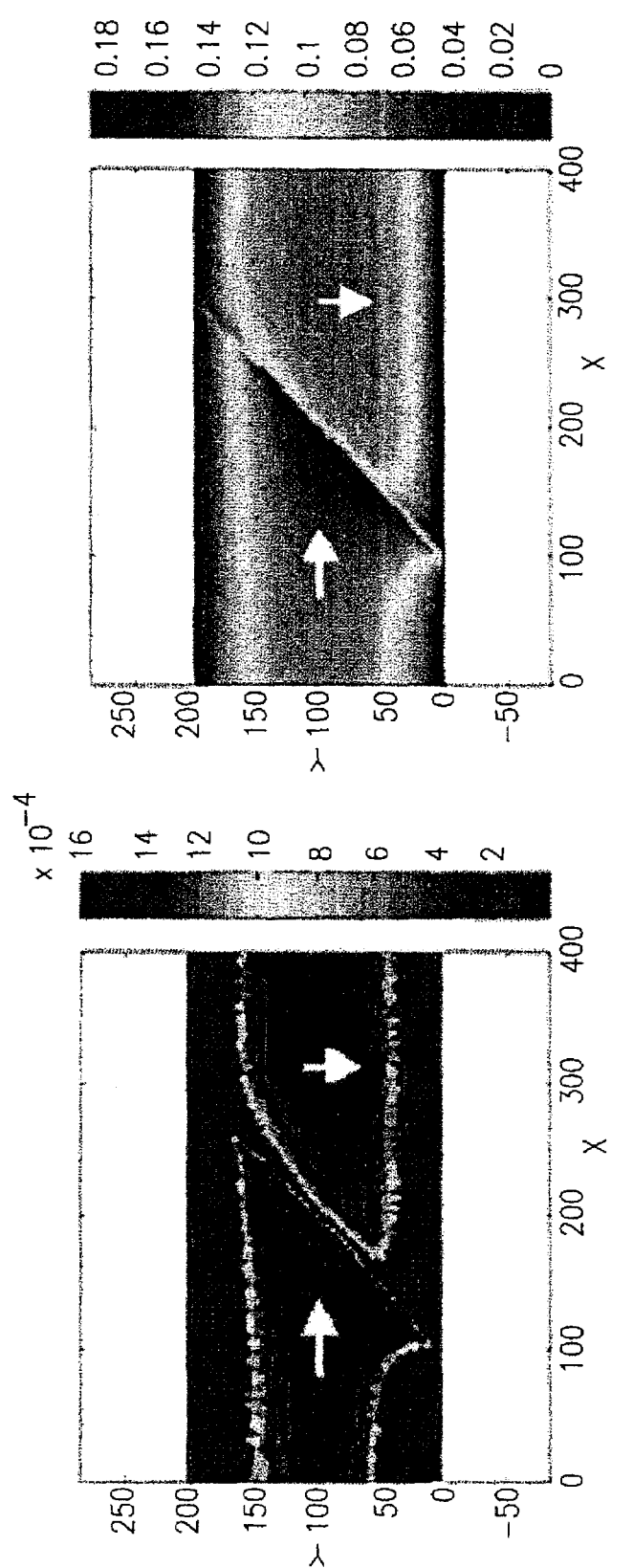
FIG. 13 shows the development of space charges and the resulting local electric field near a 90 degree domain wall in an n-doped specimen (Oxygen vacancies).

FIG. 13 shows the development of space charges and the resulting local electric field near a 90 degree domain wall in an n-doped specimen (Oxygen vacancies). Finally FIG. 13 shows the electric field for a crystal with patterned electrodes to create modulated domain patterns.

II-1-2 Photorefractive Effect

Barium titanate is a photorefractive medium. When illuminated with light in the visible, charges are excited into the conduction band from traps in the crystal. These charges diffuse away from the point of excitation before they are retrapped. When there is a gradient in the illumination pattern, this process establishes space charge fields with charges accumulating in the darker regions. The presence of the electric field modulates the index of refraction of the material which in turn modulates light incident on the crystal. This mechanism is known as electrical fixing. One of us has used this to permanently store holograms recorded via the photorefractive effect in materials such as $LiNbO_3$. The same internal fields can also be used to locally align the domains of the crystal. Typically, a strong external field is applied and the internal photorefractive field either adds or subtracts from it to cause the domains to flip. This mechanism offers the potential to define photonic band gap structures in barium titanate using holographic recording. It is also possible to define 2-D and 3-D periodic structures using multiple interfering beams. Further, the photorefractive effect can also be used to change the refractive index of the material.

It is believed that we can exploit the strong nonlinear optical properties of barium titanate to synthesize soliton logic in ferroelectric microstructures. A spatial soliton forms in a medium with a saturating third order nonlinearity when the self-focusing due to the nonlinearity compensates the defocusing due to diffraction. Collisions between solutions are ballistic and they can be used to define a logic family. Barium titanate photonic band gap structures are particularly interesting for soliton formation due to nonlinearity and the spatial dispersion properties of the material. Light propagating in certain directions in a photonic band gap is nearly diffraction free because the velocity of wave propagation does not vary with direction. Therefore, only a small amount of nonlinear self-focusing is required to form a soliton. This translates to a very low energy requirement for soliton formation, a key attribute for any soliton logic device.

II-1-3 Piezoelectricity, Electrostriction and Strain Effect

Figure 14:
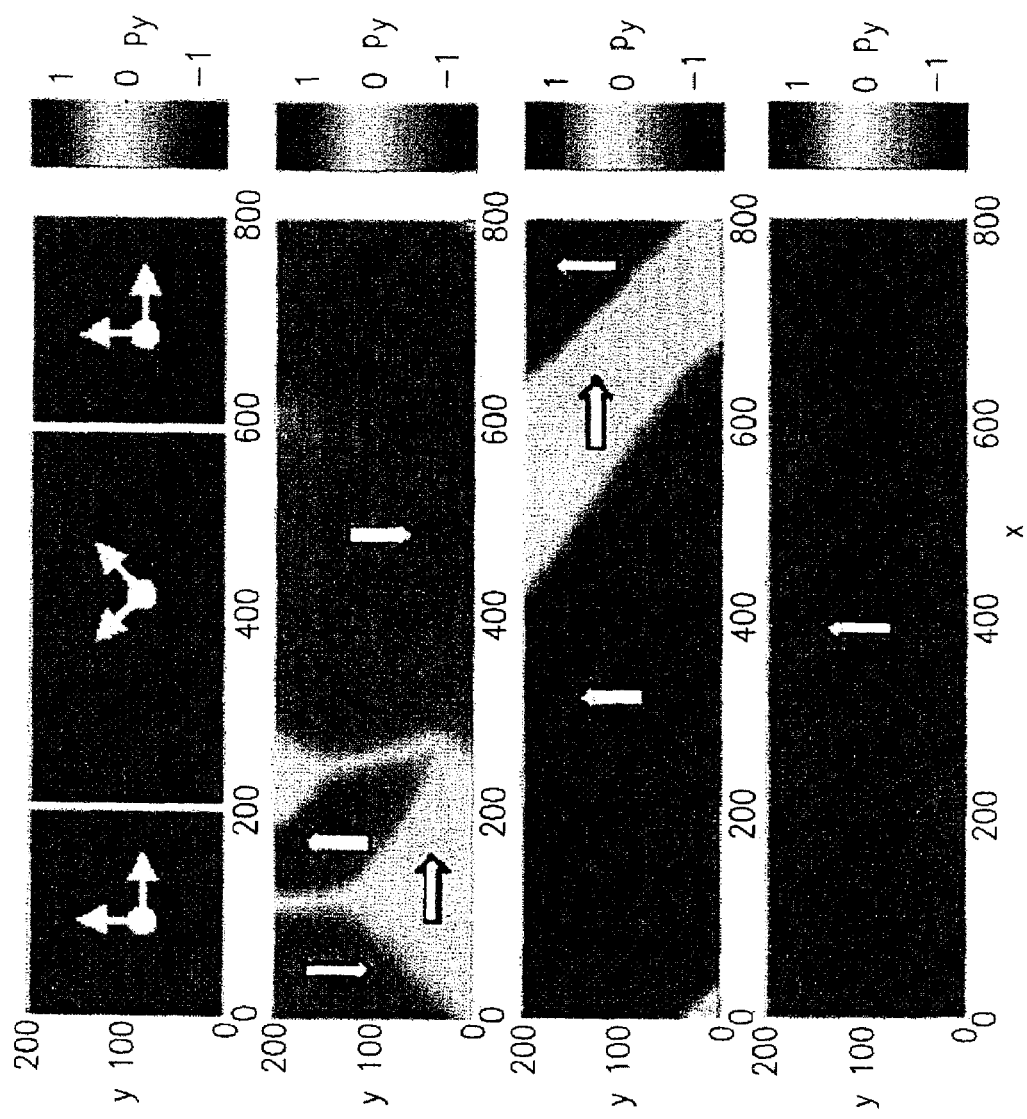
FIG. 14 shows the evolution of polarization under fixed compressive stress and cyclic electric field in a bicrystal.

Ferroelectric materials distort and change shape when subjected to an electric field. If this electric field dependence is linear (or more generally, if the dependence is described by a parameter raised to an odd power), this is known as piezo-electricity. If electric field dependence is quadratic (or more generally, if the dependence is described by a parameter raised to an even power), it is known as electrostriction. Both piezoelectricity and electrostriction can have small signal intrinsic and domain switching extrinsic manifestations. FIG. 14 shows the evolution of polarization under fixed compressive stress and cyclic electric field in a bicrystal. These modeling efforts were supplemented by detailed studies of domain walls, patterns and evolution.

We have demonstrated the use of controlled domain switching under electromechanical loading.

II-2 Materials

II-2-1 $ABO_3$ Perovskites

Ferroelectric materials, such as $BaTiO_3$ and $LiNbO_3$, exhibit spontaneous polarization and form domain patterns that can be switched through applied electric field. They possess high refractive index and birefringence that can be tuned through the application of electric fields. The ability to synthesize high-quality bulk crystals of $LiNbO_3$ and to modulate the index using DC electric field to modulate the index via the $3^{rd}$ order nonlinear optical coefficient has led to the development of commercial high speed (10-40 Gb/sec) electro-optic modulators formed as diffused waveguides in bulk $LiNbO_3$. Millimeter-scale cavities in $LiNbO_3$ have previously been used as tunable RF cavities, but little effort has been made to design electro-optically tunable photonic crystals at the micron scale. Neither has there been a systematic exploitation of $BaTiO_3$ which offers tunability complementary to $LiNbO_3$. In $LiNbO_3$ the electro-optic coupling ratio n/E is approximately 3 times larger for light polarized along the z-axis of the tetragonal structure compared to light polarized in the x-y plane. In contract, in $BaTiO_3$ this ratio is approximately 3 times smaller along the z-axis compared to the x-y plane.

Figure 15:
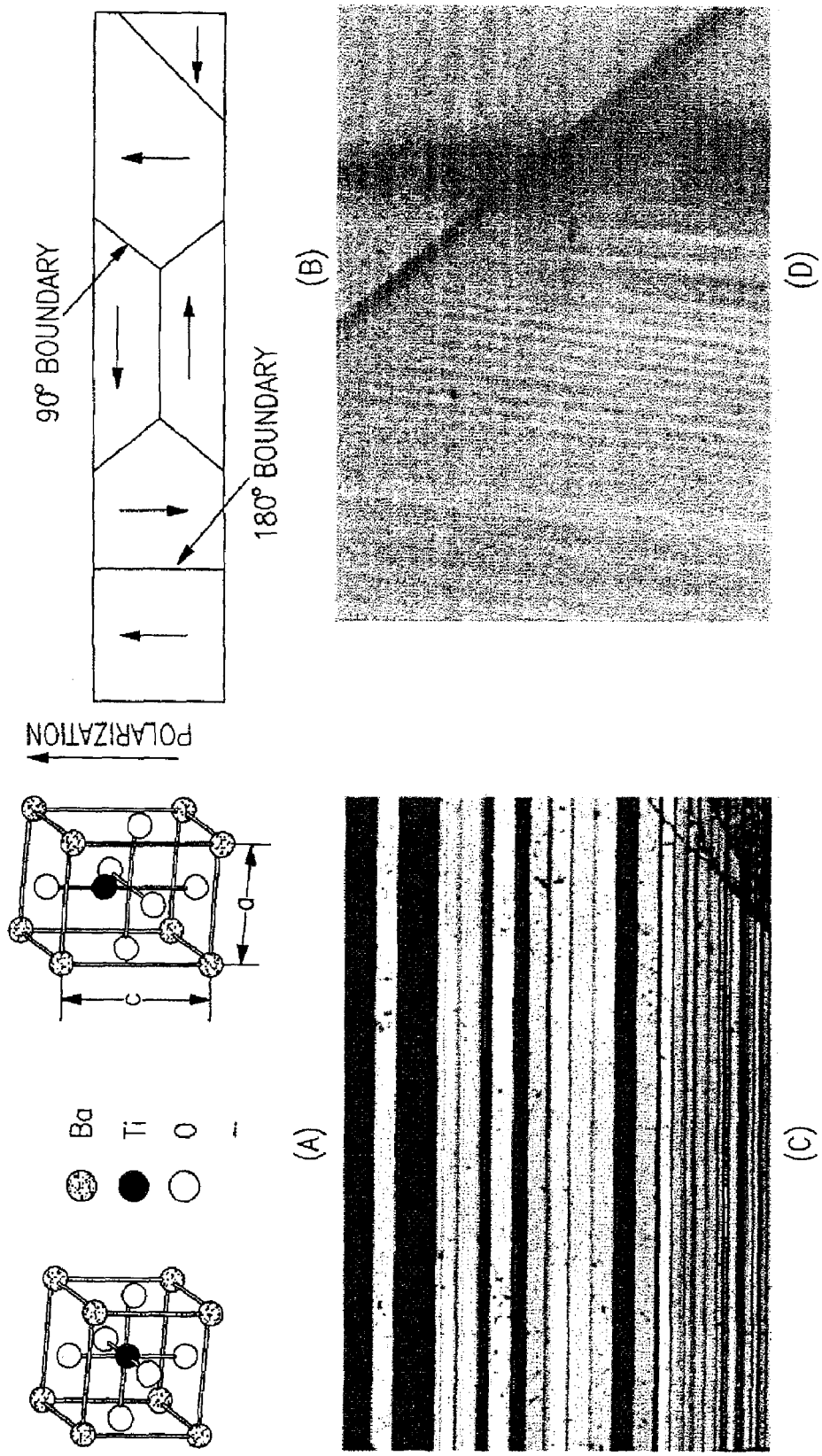
FIG. 15 is a diagram showing some of the features of an exemplary ferroelectric material.

FIG. 15 is a diagram showing some of the features of an exemplary ferroelectric material. FIG. 15(a) is a diagram of the high-temperature nonpolar cubic (on the left) and the low-temperature <001>-polarized tetragonal states of barium titanate. FIG. 15(b) is a schematic diagram of domain patterns in a ferroelectric crystal below its transition temperature. FIG. 15(c) and FIG. 15(d) are polarized light micrographs of domain patterns of a ferroelectric crystal at the micron scale.

A typical crystal contains a mixture of variants with domains of one variant separated from the other by domain walls as shown in FIG. 14. FIG. 14 is a diagram that shows the nucleation and evolution of domains in a biaxially textured bicrystal subjected to uniform mechanical stress and a cyclic electric field. In FIG. 14, the stress is imposed along the y direction, and the domain having its axis aligned with the stress is seen to grow at the expense of domains that are energetically disfavored because their axes are aligned either anti-parallel or orthogonal to the applied stress.

The systems and methods of the invention can also be used to conduct fundamental studies of ferroelectrics using photonic crystals. Photonic crystals and devices with their unprecedented ability to confine light provide new opportunities to conduct fundamental studies of the nonlinear and domain properties of ferroelectrics. Recent work has provided a detail understanding of the structure of domain walls. However, the dynamics of domain switching remains one of outstanding issues in understanding the fundamental physics of ferroelectrics. A key difficulty is establishing loading conditions that allow for controlled motion of domain walls. This can be overcome using the photorefractive effect under uneven illumination as recently demonstrated for 180° domain walls in rhodium-doped barium titanate. The systems and methods of the invention are expected to allow one to investigate the dynamics of domain wall mobility in-situ under optical loading. One approach is to design and fabricate nanostructures on free-standing single crystal films to confine light in a small volume containing a suitable domain wall. Domains driven by illumination are expected to be visualized using polarized microscopy with a near-field objective and a long distance working microscope. One can then infer the dynamics from the illumination and images recorded using a high-speed digital camera (for example, from 16 frames up to 100 million frames/s). A result of such a simulation shows that a periodic arrangement of some domain walls with a spacing of tens of nanometers actually have a band-gap that can be tuned by changing the volume fraction of the domains.

The above description has been given with respect to perovskites. There are other materials that are ferroelectrics that do not have either perovskite structure, or $ABO_3$ stoichiometry. Such materials may exist in other crystal symmetries than tetragonal. Another material class that is potentially useful in the present invention are piezoelectric materials. An example is Rochelle salt, or potassium sodium tartrate ($KNaC_4H_4O_6.4H_2O$), which is orthorhombic. Piezoelectric materials exhibit an electric polarization in response to mechanical force. The piezoelectric effect is reversible in that piezoelectric crystals, when subjected to an externally applied voltage, can change shape by a small amount.

II-2-2 Liquid Crystal Elastomers

Liquid crystal elastomers were first proposed theoretically by P. G. de Gennes and subsequently fabricated by H. Finkelmann in the 1980s. Liquid crystal elastomers are materials that combine liquid crystals with long chain organic polymers. One description of these materials includes the following comments:

The molecular structure of a liquid crystal elastomer is similar to that of conventional rubber as it consists of long chains of molecules that can slide past each other easily and so allow the material to be stretched with little effort. Attached to these chains like the branches of a tree are smaller rod-like molecules that are usually found in liquid crystals. They allow the material to interact with light and can align the long chains and give unexpected mechanical properties, such as the ability to change color when they are stretched and the ability to drastically change their shape either when they are heated or—for certain versions of the materials—when light falls on them. They have a variety of potential uses. For example they could provide the basis for a laser which only needs a small amount of power to operate and can change its wavelength (color) just by being stretched.

II-3 Synthesis

II-3-1 Pulsed Laser Deposition

Pulsed laser deposition is a well known technique for making materials in thin film form. The pulsed laser deposition method of thin film growth involves evaporation of a solid target in an ultra high vacuum chamber by applying short, high-energy laser pulses to one or more source materials situated in the vacuum system in proximity to a substrate upon which the thin film is to be grown. The pulsed laser beam is used to vaporize the surface of the target to form a vapor. The vapor condenses on the substrate, forming the film. Thin films of various materials including oxides, nitrides, metals, and superlattices have been fabricated using such methods.

II-3-2 Chemical Vapor Deposition

Chemical vapor deposition (or CVD) is a well known deposition technique for making many kinds of materials, including semiconductors such as silicon, III-V compounds and their alloys, metals, oxides, and other compounds. A typical CVD reactor is commonly a tube-type reactor, which may be heated by any convenient heating system, including multi-zone heating systems. Reagent gases, commonly carried in inter carrier gases, are introduced into the CVD reactor under controlled flow and concentration conditions. The reagents react to form deposited layers having desired chemical composition, possibly including doping, and possibly including desired chemical gradations. Substrates, having specific compositions and in some instances comprising single crystals having specified crystallographic orientations, can be used as surfaces upon which the grown films are deposited. The substrate may be subjected to cleaning prior to the deposition of one or more layers thereon.

II-3-3 Molecular Beam Epitaxy

Molecular beam epitaxy is a well known crystal growth technique that has been applied to many different materials systems. MBE is commonly carried out in an ultra high vacuum system in which one or more substrates are provided. The substrate may be subjected to cleaning prior to the deposition of one or more layers thereon. In the MBE technique, source materials, commonly in the form of elemental materials, are provided in individual source furnaces or effusion cells. By heating the materials under ultra high vacuum conditions, a beam of atoms of the source material is produced. In some instances, elements that melt and/or boil at low temperatures may be introduced as a stream of vapor, possibly in the form of simple compounds that comprise specific elements. The beams of the various atoms are directed to the surface of the substrate, where they are deposited. Thin films are grown by the epitaxial deposition of material, sometimes in layers as thin as monatomic layers. While MBE is generally a slower growth technique than CVD, it can provide materials of extremely precise composition and in extremely high purity. It is common that MBE apparatus include in situ analytical methods in order to test the composition and thickness of deposited layers during, or in conjunction with, the deposition process.

II-3-4 Layer Transfer

Figure 16:
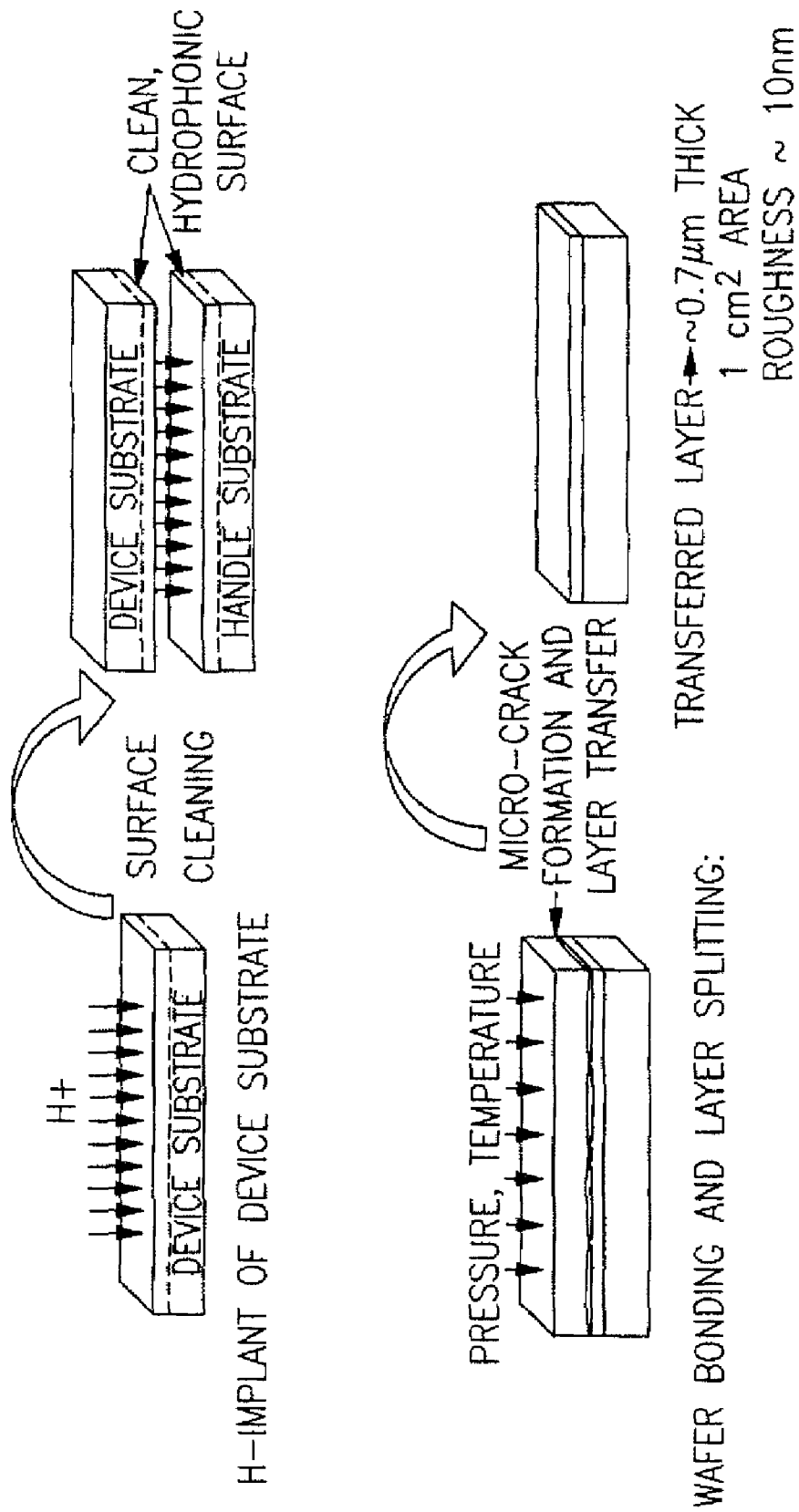
FIG. 16 is a schematic diagram that illustrates the layer transfer process.

A combination of molecular beam epitaxy and ion implantation-induced layer transfer processes can be used for the synthesis of high quality single crystal ferroelectric thin films. FIG. 16 is a schematic diagram that illustrates the layer transfer process. In FIG. 16 a device is subjected to hydrogen ion implantation. The surface of the device is cleaned. Then the device is inverted and positioned in registry with a layer (the "handle substrate") that serves as a mechanical support for the device so that clean, hydrophobic surfaces are adjacent each other. The device and the substrate are then bonded by the application of pressure and temperature. Under appropriate conditions, the device is adhered to the support, and the substrate in which the device was fabricated is removed as a result of the generation of a layer of micro-cracks in that substrate. The resulting structure is the device adhered to the handle substrate. In some instances, a layer measuring of the order of a micron in thickness, having an area of the order of 1 $cm^2$, and a surface roughness measured in tens of nanometers can be obtained.

Figure 17:
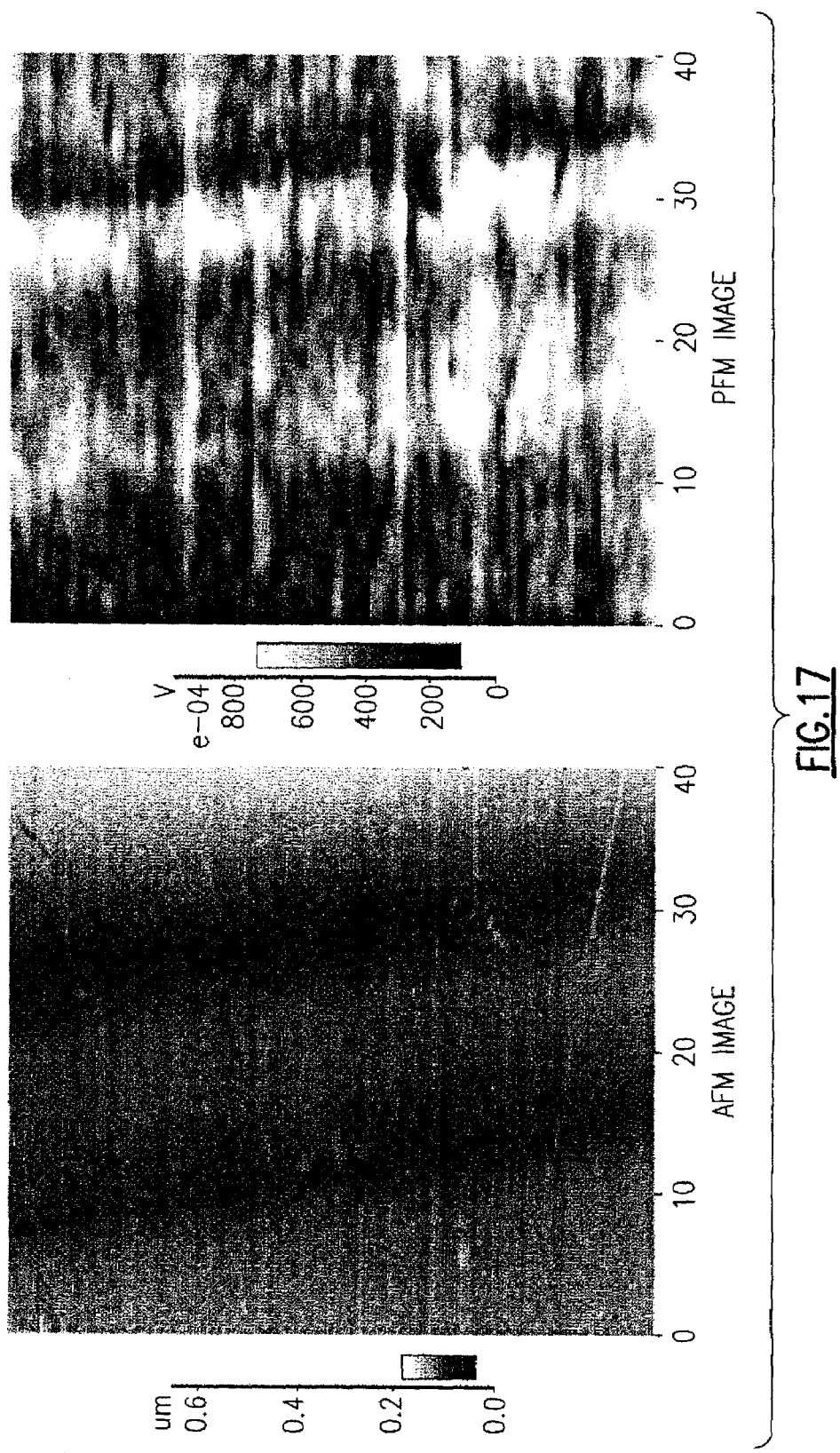
FIG. 17 is a diagram showing an atomic force micrograph (AFM) and a piezoresponse force micrograph (PFM of a transferred layer.

FIG. 17 is a diagram showing an atomic force micrograph (AFM, on the left) and a piezoresponse force micrograph (PFM, on the right) of a transferred layer. The material is 300 nm thick single crystal $BaTiO_3$ having an area of 25 $mm^2$ on a substrate of silicon nitride ($Si_3N_4$) on silicon. The ferroelectric domain structure in the single crystal films is remarkably similar to that seen in bulk single crystals. Similarly, the ferroelectric properties including polarization, coercivity and cyclability) are unimpaired by the process and remarkably similar to that of bulk single crystals.

In this process, high dose ion implantation serves to delaminate a high-quality, large-area, single-crystal ferroelectric film of thickness equal to the projected ion range, which is typically 1 μm or less. This film is transferred to another substrate by wafer bonding prior to layer splitting. This method has already found application in high-volume production of silicon-on-insulator wafers of quality suitable for ultra large-scale integrated circuits for Si microelectronics.

Epitaxial growth is also a promising approach for $BaTiO_3$ film synthesis on Si-based structures. Molecular beam epitaxy can be used for growth of high quality barium titanate on silicon-on-insulator suitable for photonic crystal fabrication. High quality epitaxial barium titanate films have been grown directly on silicon-on-insulator structures, and also on MgO templates on Si and silicon nitride.

III Apparatus for Applying the Tuning Fields

In one embodiment, electrical fields are applied to control the behavior of ferroelectric photonic materials and devices. By controlling the applied electric field, one can modify the physical characteristics of the ferroelectric both as to domain structure and domain wall motion. The electric field can advantageously be provided by way of electrodes placed adjacent the ferroelectric medium. In some embodiments, it may be advantageous to use electrodes that are transparent in some region of the optical spectrum, for example if one wants to permit light propagating in a direction having a component normal to a surface of an electrode to impinge on or to emanate from the region where the ferroelectric medium is present.

III-1 Planar Electrodes

II-1-1 Metal Electrodes

It is common to apply metallization in semiconductor processing for application of signals, for interconnection of devices, and for connection of devices on a chip to other circuit elements. It is known to apply multilayer metallic conductors, with layers provided to perform such functions as increasing the conductivity of the metallic electrode (e.g., copper leads), provide adhesion of the electrode to a surface upon which it is being deposited (e.g., Ti layer to obtain adhesion to silicon), and/or to chemically isolate a layer of metallization from a substrate to avoid unwanted chemical interactions (e.g., intermediate layer between silicon substrate and aluminum metallization to avoid "purple plague").

In the ferroelectric nanophotonic materials and devices of the invention, assuming a planar geometry for simplicity, one can envision the application of electric fields as the analog of charging a capacitor in which the dielectric is the ferroelectric medium (with or without other layers). In such a situation, there is nominally no electrical current that is conducted through the ferroelectric medium, but only the introduction of a charge of one or more charge carriers of a given polarity on one plate of the capacitor, and a corresponding extraction of a substantially equal number of charge carriers of the same polarity from the other plate of the capacitor. In such a situation, there is no reason why one cannot introduce as necessary an intermediate layer between an electrode and a ferroelectric material for purposes of improving adhesion or for purposes of reducing deleterious chemical interactions, even if such intermediate layer is not a conductor, because no current needs to flow through the intermediate layer. For example, one could in principle deposit electrodes on a layer of material such as a plastic, and then mechanically position that layer, with the electrodes thereon, in registry with the ferroelectric medium.

II-1-2 Oxide Electrodes

There are well known conductive oxides that can be used as electrodes, including some that are transparent in at least some portion of the optical spectrum. Such materials can include indium tin oxide (ITO), $SrRuO_3$, $TiO_2$, other conductive oxides, variants of these oxides prepared by the addition of one or more dopants and defect oxides (e.g., oxides having a slight deficit or excess of oxygen as compared to the strictly stoichiometric amount of oxygen that would be expected if each metal had an oxidation state represented by an integer of electrical charge). As has already been indicated, there are numerous preparative methods available for depositing such oxides as layers on other substances, including such methods as evaporation of component or mixed oxides and deposition of metals followed by oxidation. In some embodiments, thermal treatment in a controlled atmosphere environment may be used post deposition.

II-1-3 doped-Silicon Electrodes

It is well known in the semiconductor arts to deposit doped polycrystalline silicon as an electrically conductive path or trace. There is a well developed technology for depositing such electrically conductive silicon. In principle, such conductive polycrystalline silicon can be used both for conductive lines and for regions that represent one or more plates of a capacitor, and it is so used in the semiconductor industry today.

II-1-4 Carbon Nanotube Electrodes

Recent publications indicate that single wall carbon nanotubes (SWNTs) will function as transparent metallic conductors if present in high density. Reports have appeared that conductive layers can be fabricated by dispersing commercially available SWNTs using solvents and surfactants and then printing or spraying the material onto a substrate. There are reports that such films have been used to make anodes in organic light-emitting diodes, and in a flexible solar cell that rivals solar cells made from ITO on glass. An alternative method of preparing conductive layers of SWNTs is to grow SWNT networks via chemical vapor deposition and then transfer the material onto a plastic substrate through a dry-transfer technique. As an example, the method has been used to fabricate a highly bendable, transparent thin-film transistor in which all the conducting and semiconducting components were made from SWNT networks. It is expected that such transparent conductive layers could be used in devices according to the principles of the present invention.

III-2 Interdigitated Electrodes

In some instances, for example when access to a ferroelectric medium is only available from one side, where it is advantageous to apply electrical fields in a plane, or in instances where the fringing fields are adequate, one can apply interdigitated electrodes to one side of a material and provide electrical excitations using those electrodes. Interdigitated electrode may also be useful to generate certain high frequency signals, and to launch excitations such as surface waves that may be useful in specific kinds of devices. As regards interdigitated electrodes, any electrode material can in principle be used. It is sometimes advantageous to produce an interdigitated electrode pattern for later application to a specific area of a device, for example by layer transfer, or by simply positioning the interdigitated electrode array in suitable registry with the device.

III-3 Mechanical Loading Device

Mechanical loading can also be used to tune the ferroelectric photonic device by various methods. The domains in the ferroelectric medium can be induced to switch through the application of stress thereby giving rise to a change in refractive index. Alternately, the piezoelectric, electrostriction and strain effect can cause a change in the shape of the ferroelectric photonic device. Since the dispersion relation depends on the geometry of the device, the change in shape causes a change in the dispersion relation. Mechanical loading can be applied in a variety of ways. In one embodiment where the ferroelectric photonic device is planar, the planar device can be sandwiched between two loading platens which are squeezed together. In another embodiment the tip of an atomic force microscope is pressed against a photonic device to apply mechanical loading.

III-4 Optical Illumination and Photorefractive Material

The control of the ferroelectric nanophotonic device can in some embodiments involve the use of light. As has been indicated, there can be instances when the intensity and distribution of illumination can be used to create or to modify charge fields within the ferroelectric medium so as to modify the domain structure of the medium, or to write holographic images in the medium. In some embodiments, the optical source that can be used for such modification can be coherent light, for example from a laser, in particular if it is intended to generate periodic grating-like images in the medium. In some embodiments the light can be incoherent light, for example from an optical source such as an incandescent bulb, a gas discharge lamp, or an arc lamp. The light sources can be controlled as to their intensity as a function of time and position. The light sources can be selected to operate at desired frequencies or wavelengths.

The ferroelectric nanophotonic devices of the invention are intended to operate on light, for example as optical switches, computers, and modulators. Accordingly, there are provided input and output ports, including possibly pluralities of each of input and output ports, which can be designed to make convenient connection to standard optical systems, such as optical communication systems employing optical fibers. The input and output ports can be in the form of mechanical alignment devices that accept the end of a conventional optical fiber, using a conventional coupler. In some embodiments, there are input and/or output ports in the form of high index contrast waveguides, including as necessary lenses to pre- or post-process a beam of light for interfacing with external optical systems.

In some embodiments, in which the ferroelectric nanophotonic devices of the invention are fabricated on, or are interconnected with, substrates materials that can provide the interconversion of electrical signals and optical signals, for example, electrically powered light sources or lasers, and/or detectors that convert optical signals to electrical signals such as photodetectors, there is the possibility of providing interconnectivity between ferroelectric nanophotonic devices of the invention and conventional systems that operate using electrical signals.

III-5 Computer or Controller

As have been described, there are provided apparatus and systems for applying tuning signals, such as one or more of electrical fields, mechanical loading, and optical illumination, in order to control the operation of a ferroelectric nanophotonic device. It is useful to provide one or more control circuits, such as programmable computers or controllers, to control and to apply the desired tuning signals in order to control the operation of the ferroelectric nanophotonic device. The computer or controller can be a conventional programmable general purpose computer or controller, with conventional input/output capabilities, with suitable machine-readable instructions or programs, and with memory. The last few paragraphs of the disclosure provide more description of the possible computer apparatus and associated machine-readable instructions that are contemplated for use in various embodiments. In some embodiments, the conventional computer or controller can be used to program features of optical computational capability that may exist in the ferroelectric nanophotonic device or system, such as initializing operating states, defining logic gates, and installing the equivalent of "software," which may be thought of as analogous to a boot program for a conventional general purpose computer.

As has previously been explained, in nanophotonic devices fabricated in conventional static media, the operational characteristics of the device are defined by the structure provided at the time the device is fabricated, and both the structure and the associated characteristics are fixed, and are stable. Such devices do not need to be controlled, and start up occurs in a predefined mode of operation. By comparison, in ferroelectric nanophotonic devices of the invention, the devices are intentionally designed to provide the ability to modify the underlying structure of the ferroelectric material and the properties of the device so as to provide tunability. A cost of such tunability can be a decrease in the stability of operation of the device, for example if the applied tuning signals vary over time, or for example if the applied signal at start-up of the operation of the device is incorrect or if the correct value of the signal is not known at start-up. Accordingly, in some embodiments, it can be advantageous to provide a feedback loop in which a parameter of operation of a ferroelectric nanophotonic device, for example a wavelength of emission of a laser, is measured by a sensor r a detector, and the measured value is provided to the controller or control computer for comparison against the desired or intended value of the parameter of operation. If a deviation beyond an acceptable range is identified, the controller can modify an applied tuning signal to correct the operation of the ferroelectric nanophotonic device to fall at the desired value or within the desired range. As an example, a ferroelectric nanophotonic device might include a conventional photonic bandgap device at a known location and having a bandgap at a known wavelength (for example to be used as a fiduciary value), so that light at the bandgap frequency will be reflected and light at other frequencies will be transmitted. In operation, the ferroelectric nanophotonic device operating as a laser can then be tuned to this "fiduciary value" of wavelength and the operational parameters of the device at that value identified and recorded, so that tuning to desired values can be accomplished by applying suitable corrections to the tuning or driving signals. In this way, one can account for the variability of the materials employed, of the fabrication techniques applied, and of the structures used to apply tuning signals between one device and the next device, both intended to be "identical" in operation. In some embodiments, hardware can be provided for interconverting analog signals and digital values so that the properties of the device (or of the analog signals such as light that it is manipulating) can be provided to a digital computer or controller, and so that a digital value generated by a computer can be converted to an electrical signal useful for operating a tuning signal source, as may be required. For example, one can use analog-to-digital and digital-to-analog conversion hardware, which is well known, and which is available commercially with precision in excess of 20 bits, for interconverting electrical analog signals and digital signals suitable for use in a control computer.

II-6 Power Supply

As has been described, there are provided in various embodiments systems for applying electrical, optical and mechanical tuning signals to the ferroelectric nanophotonic devices of the invention. In such instances, there is provided one or more power supplies to power the sources of the electrical, optical and mechanical tuning signals, and as necessary, for powering the control circuit that controls the source. The power supplies in some embodiments are capable of being controlled with digital signals supplied by a control computer. Electrical power can be supplied by any conventional electrical power source.

IV Apparatus for Coupling Light

IV-1 Optical Grating

Optical gratings are conveniently employed for selecting light of desired wavelengths for coupling into optical systems. In various embodiments, one can use Bragg gratings for selective reflection of some wavelengths and transmission of others.

IV-2 Prism Coupling

Prism couplers have been employed for coupling light into thin films using evanaescent waves. The properties of the tin film can be studied by observing the decrease in intensity of a source laser as a function of angle of incidence of the laser light on the prism. At certain angles, which may be referred to as mode angles, the laser light is coupled into the thin film. Commercial measurement instruments that operate on the principle of prism coupling for use in studying thin films are available for example from Metricon Corporation, 12 North Main Street, Pennington, N.J. 08534.

IV-3 Tapered Fiber Coupling

Tapered fiber couplers made from high index materials such as silicon can be used to introduce light from an optical fiber into a thin waveguide such as a photonic crystal. In some instances, biconical designs are employed to reduce the size of the optical cross section from that of an optical fiber (micron dimensions) to the typically nanometer dimensions that are present in the photonic crystal. When operated in the reverse direction, signals can be extracted from the photonic crystal and introduced into an optical fiber.

IV-4 Butt Coupling

In some embodiments, it is possible to use a butt coupling method to provide efficient coupling between optical fibers and photonic crystal. Se for example D. Taillaert, et al. "Design of an out-of-plane coupler for efficient butt-coupling from photonic crystal waveguides to single mode fibers" Workshop on electromagnetic crystal structures (PECS 3), St-Andrews, UK, Jun. 9-14, 2001.

IV-5 Plasmon Coupling

Surface plasmons are electromagnetic excitations that propagate along a metal-dielectric interface, or along chains of metallic nanoparticles. Surface plasmons and photons do not couple efficiently due to their different dispersion relations. This mismatch can be overcome by using microstructuring or near-field coupling techniques. One of us has studied integrated plasmon and dielectric waveguides, and has observed enhanced light emission in such systems.

V Mode Confinement

The ferroelectric photonic device can be fabricated in various geometries.

V-1 Planar Ferroelectric Core

In the planar ferroelectric core geometry, the photonic band-gap material is fabricated entirely from a planar slab of ferroelectric material.

V-2 Planar Silicon-on-Insulator/Ferroelectric Core

In this geometry, the ferroelectric material is deposited on top of silicon-on-insulator. The photonic band-gap structure is fabrication into both the ferroelectric material and the silicon. In this geometry, the light is not limited to the ferroelectric material but encompasses both the ferroelectric and the silicon, but the tuning is obtained through the ferroelectric material. Such structures are expected to have an advantage in terms of coupling light into and out of the device.

V-3 Planar Plasmon/Ferroelectric Core

Plasmon modes refer to surface electronic modes observed in some metals like gold and silver that can be coupled to light. In this geometry, the ferroelectric material and a suitable metal form an interface. The light is transmitted through this medium through a combination of the ferroelectric and the plasmon and the tuning is obtained through the ferroelectric. Such structures are expected to have an advantage in terms of coupling light into and out of the device V-4 Three-Dimensional Ferroelectric Modes These are structures fabricated using bulk ferroelectric materials with a three dimensional geometry. Light is allowed to propagate in a number of directions.

Figure 18:
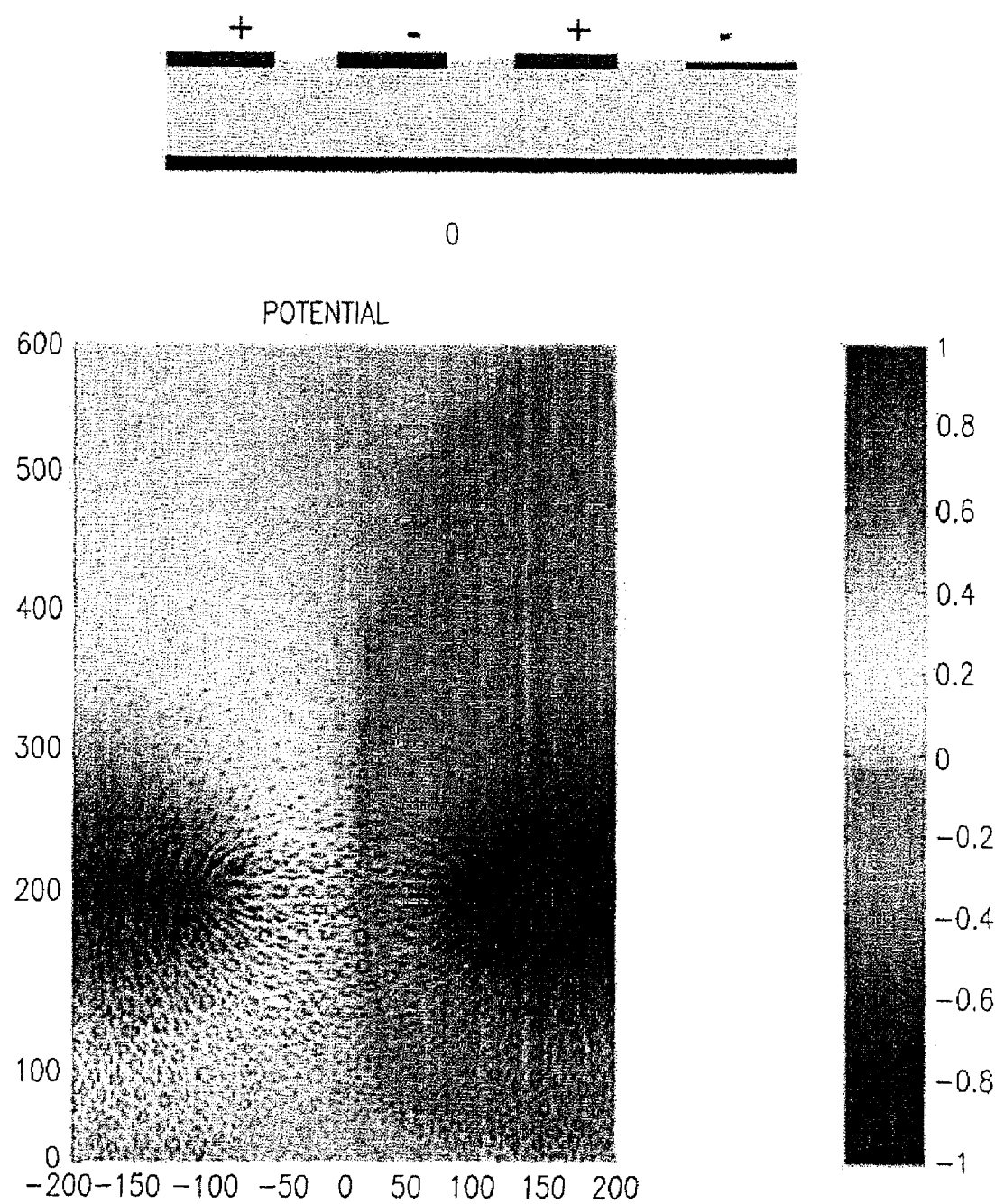
FIG. 18 is a diagram of a ferroelectric microactuator with patterned electrodes used of obtain controlled domain switching.

FIG. 18 is a diagram of a ferroelectric microactuator with patterned electrodes used to obtain controlled domain switching. The computed electric field is also shown.

Figure 19:
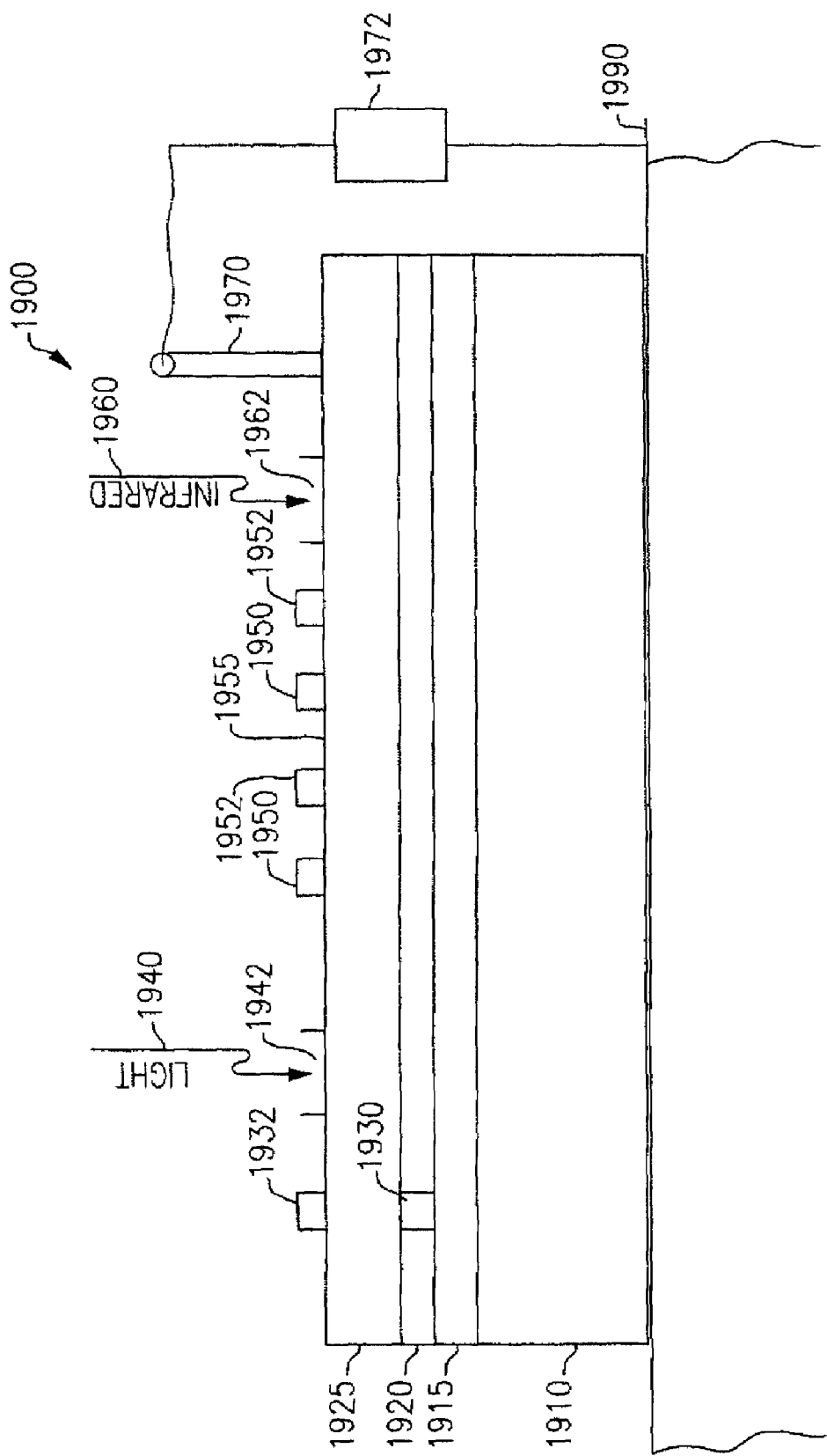
FIG. 19 is a diagram showing in elevation a cross section through various tuning apparatus structures that can be applied to ferroelectric photonic devices, according to principles of the invention.

FIG. 19 is a diagram 1900 showing in elevation a cross section through various tuning apparatus structures that can be applied to ferroelectric photonic devices. FIG. 1900 is not drawn to scale. In FIG. 19. there is provided a substrate 1910, such as a single crystal silicon wafer. The substrate 1910 can have thereon an insulating layer 1915, which can be silicon oxide. A layer 1920 of a material such as semiconductor silicon is provided adjacent the insulating layer 1915. In some embodiments, the three layers silicon 1910, silicon oxide 1915 and silicon 1920 are conveniently provided as a commercially-available silicon on insulator (SOI) wafer. Adjacent the silicon layer 1920 there is provided a layer of a ferroelectric material 1925, such as single crystal LiNbO$_3$ or single crystal BaTiO$_3$. The layer of ferroelectric material 1925 can be deposited, grown in situ, attached using the layer transfer process previously described, or provided by any convenient means. The layer of ferroelectric material 1925 can be patterned by any convenient process, such as etching using a pattern defined by photolithography or by electron beam lithography. In FIG. 19, the patterning is not shown for simplicity.

Electrodes can be provided to allow the application of electrical signals or electrical fields to the ferroelectric material. For example, electrode 1930 is a region in the silicon layer 1920 that has been converted to doped silicon having a high enough doping density to be substantially conductive. In one embodiment, electrode 1930 is a region in which ions are added by implantation or by diffuse. In another embodiment, electrode 1930 is a region where the silicon of the silicon layer 1920 is etched away and the void so created is then filled with highly doped polycrystalline silicon to provide a conductive electrode. In yet other embodiments, electrode 1930 can be a metal that is deposited within a void etched in the silicon layer 1920, or as a thin layer on top of the silicon layer 1920. In one embodiment, electrode 1932 is placed adjacent the layer of ferroelectric material 1925 in registry with electrode 1930, so that an electric field can be applied to the ferroelectric material that is situated between electrode 1930 and electrode 1932. Electrode 1932 can comprise any of a metal, a highly doped semiconductor such as silicon, a conductive oxide, and a layer of carbon nanotubes, such as SWNTs. An electrical signal is applied to electrodes 1930 and 1932 by a source not shown in the drawing.

The application of light as a tuning signal is shown next. Light beam 1940, which is provided by an illumination source not shown, impinges on a surface 1942 of the layer of ferroelectric material 1925. Many different types of beam shaping tools are known, including lenses, prisms, gratings, and waveguides, and any of these can be used as appropriate to define the shape and extent of the region where the light beam 1940 interacts with the ferroelectric material 1925.

Interdigitated electrodes 1950 and 1952 are next shown. The interdigitated electrodes 1950 are connected by a conductor out of the plane of FIG. 19 (for example closer to the viewer than the plane of the drawing), and the interdigitated electrodes 1952 are connected by a conductor out of the plane of FIG. 19 (for example farther from to the viewer than the plane of the drawing). The interdigitated electrodes 1950 and 1952 can be used to provide an electrical signal or field in a direction substantially parallel to the surface 1955 of the ferroelectric material 1925 upon which they are placed. Interdigitated electrodes 1950 and 1952 can individually comprise any of a metal, a highly doped semiconductor such as silicon, a conductive oxide, and a layer of carbon nanotubes, such as SWNTs. An electrical signal is applied to electrodes 1950 and 1952 by a source not shown in the drawing.

In one embodiment, heat or thermal energy is provided in the form of infrared energy. As shown in FIG. 19, a beam of infrared energy 1960 is applied to a surface region 1962 of the ferroelectric material 1925. The infrared energy can be applied from any convenient source of such energy, such as an infrared laser or a radiating black body. The source of the infrared energy is not shown in the drawing.

A mechanical load can be applied to a surface of the ferroelectric material. In one embodiment, the substrate silicon 1910 is disposed on a surface 1990, such as a support surface in an atomic force apparatus (for example, within an atomic force microscope). A motion controller 1972 moves a stylus 1970 to come into contact with a surface of the ferroelectric material 1925, and applies a mechanical force to a region of the ferroelectric material 1925. In other embodiments, larger mechanical forces can be provided, for example by a hydraulic press. In any embodiment, the force applied should be a force controlled to be smaller than that required to exceed a failure strength of the material having the smallest failure strength, so as not to cause damage to the ferroelectric photonic device.

Figure 20:
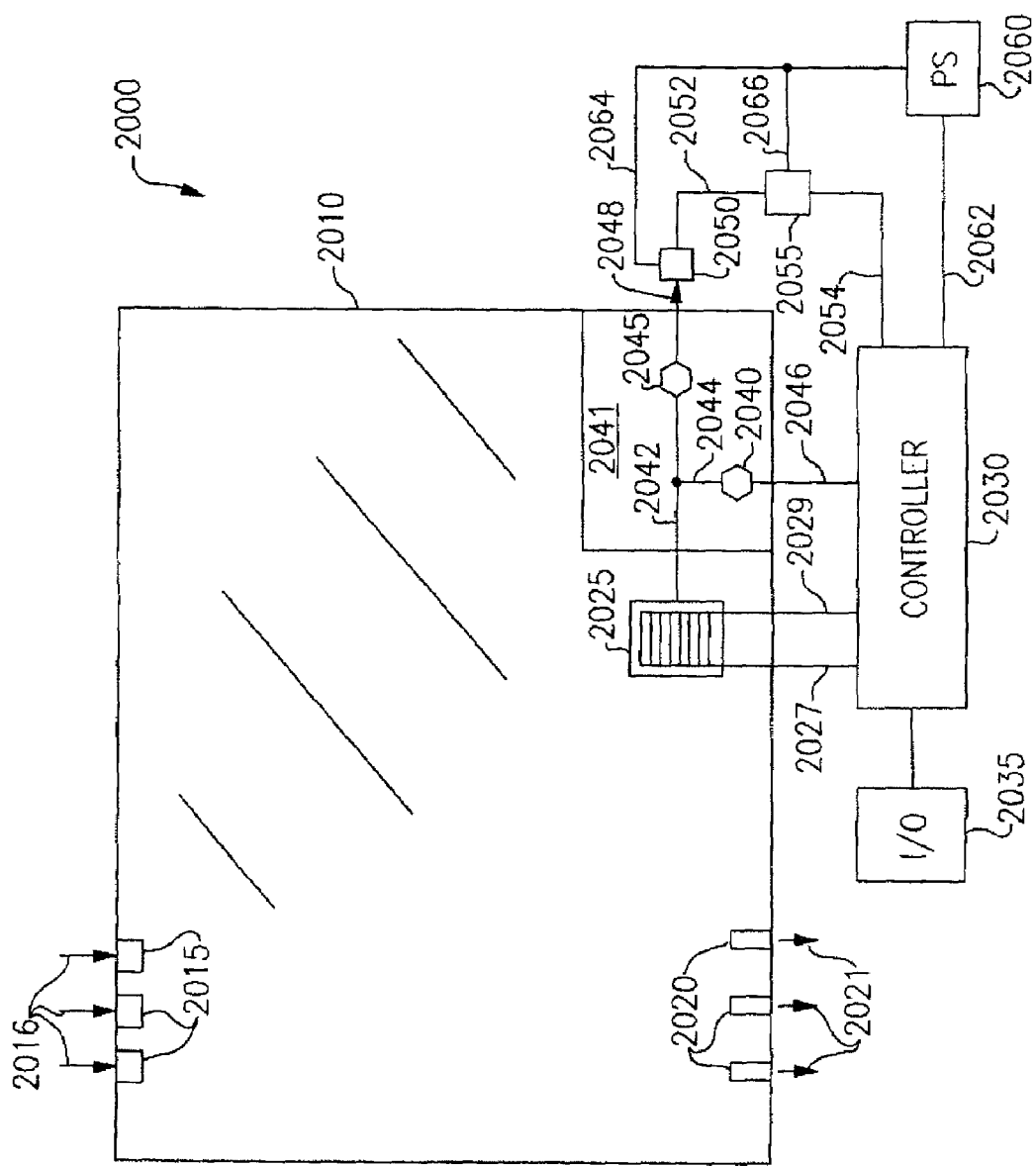
FIG. 20 is a schematic diagram showing in plan view a ferroelectric photonic device with the associated components of an exemplary system.

FIG. 20 is a schematic diagram 2000 showing in plan view a ferroelectric photonic device 2025 with the associated components of an exemplary system. In FIG. 20, the substrate 2010 is shown with one exemplary ferroelectric photonic device 2025, but it should be understood that a plurality of ferroelectric photonic devices, not all necessarily identical to device 2025, may be present on a single substrate 2010. For purposes of exposition, a plurality of optical input ports 2015 are shown, which are depicted as receiving light beams indicated by arrows 2016. For purposes of exposition, a plurality of optical output ports 2020 are shown, which are depicted as providing light beams indicated by arrows 2021.

In the embodiment shown in FIG. 20, for ease of exposition, ferroelectric photonic device 2025 is indicated as having interdigitated electrodes on a surface thereof, each electrode being connected to a controller, by an electrical conductor 2027, 2029, respectively. The interdigitated electrodes are provided to allow the application of an electrical tuning signal to the ferroelectric photonic device 2025. The controller 2030 is a programmable computer or controller as previously described. The controller 2030 is in communication with input/output components 2035, as previously described.

In the embodiment shown in FIG. 20, there are also provided in a region 2041 of the substrate 2010 one or more devices intended to provide "fiduciary" or pre-defined fixed operation. For example, there is shown a laser source 2040 which is constructed as a fixed wavelength laser that operates at a pre-defined wavelength, for example as has been described herein with regard to photonic devices that lack the ability to be tuned. Alternatively, the laser source 2040 can be a more conventional semiconductor laser. In the embodiment shown, there is also provided a photonic bandgap structure 2045 having a pre-defined bandgap at a known wavelength, for example as has been described herein with regard to photonic devices that lack the ability to be tuned. Either or both of laser source 2040 and photonic bandgap structure 2045 can be fabricated in a portion of the silicon layer 1920 of FIG. 19 or in the ferroelectric material layer 1925 of FIG. 19 in which the tuning apparatus is omitted or is inoperative. Waveguides 2042 and 2044 are provided so that laser source 2040 and ferroelectric photonic device 2025 can be operatively connected to photonic bandgap structure 2045. Controller 2030 is operatively connected to laser source 2040 by connection 2046, so that the laser source 2040 can be operated when necessary, and can be turned off when it operation is not needed. A sensor 2050 is operatively coupled to an output of photonic bandgap structure 2045. When light passes through photonic bandgap structure 2045, the intensity, and in some embodiments, the wavelength, of the light is measured by the sensor 2050. Sensor 2050 provides a signal indicative of the intensity, and as necessary, the wavelength, of the illumination that it receives. The light passing from the photonic bandgap structure 2045 to the sensor 2050 is illustrated by arrow 2048, and, if necessary, a waveguide is provided within substrate 2010 to carry such illumination. In the embodiment shown, sensor 2050 is connected by connector 2052 to (or includes as part of its structure) hardware 2055 for interconverting analog signals and digital values, so that the measured intensity (and as necessary, wavelength) of illumination reaching the sensor 2050 can be provided to controller 2030 in suitable form for use by controller 2030. The hardware 2055 for interconverting analog signals and digital values is connected to controller 2030 by connector 2054. In the embodiment shown, a power supply 2060 is provided to supply power directly to each of controller 2030, sensor 2050, and hardware 2055. The controller 2030 can supply power to the ferroelectric photonic device 2025, to I/O 2035, and as needed, to laser source 2040.

In operation, the photonic bandgap structure 2045 passes illumination that does not fall in the bandgap, and reflects illumination with the bandgap. Laser source 2040 can be designed to have a known wavelength different from the bandgap of photonic bandgap structure 2045, so that when laser source 2040 is operational, sensor 2050 senses illumination 2048. However, when ferroelectric photonic device 2025 is operated as a source of illumination, or is operated as a tunable photonic bandgap device, it may not necessarily operate at a desired wavelength upon start-up. The operation of ferroelectric photonic device 2025 can be checked, and if necessary corrected, or calibrated, as is now described.

When operated as a source of illumination, ferroelectric photonic device 2025 is tuned through a range of wavelengths, and the illumination provided is passed by way of waveguide 2042 to photonic bandgap structure 2045. Sensor 2050 will measure optical energy until the wavelength of light emitted by ferroelectric photonic device 2025 falls within the bandgap of photonic bandgap structure 2045, at which time no optical energy will pass through photonic bandgap structure 2045 to sensor 2050. Controller 2030 can be programmed to record the tuning signal parameters applied to ferroelectric photonic device 2025 that corresponds to the lack of illumination at sensor 2050, which is the tuning condition for providing illumination at the bandgap of photonic bandgap structure 2045. By operating on both sides of this condition (e.g., longer and shorter wavelengths), it is possible to demonstrate conclusively that the ferroelectric photonic device 2025 is working, and that the lack of sensed illumination is not caused by a failure of ferroelectric photonic device 2025 to operate. In the present embodiment, only one photonic bandgap structure 2045 and one sensor 2050 is described. In principle, a plurality of such structures and as needed, sensors, can be provided to allow tuning at more than one "fiduciary" wavelength to be accomplished.

When operated as a photonic bandgap structure, ferroelectric photonic device 2025 can be probed with illumination from laser source 2040. At the condition when ferroelectric photonic device 2025 exhibits a bandgap at the wavelength of laser source 2040, the full intensity of light from that source will be reflected, will pass along waveguide 2042, and will pass through photonic bandgap structure 2045 to be detected at sensor 2050. This sensed signal indicates what tuning signal needs to be applied to ferroelectric photonic device 2025 to cause it to behave as a photonic bandgap device having a bandgap at the wavelength of laser source 2040. In the present embodiment, only one laser source 2040 and one sensor 2050 is described. In principle, a plurality of such laser sources and as needed, sensors, can be provided to allow tuning at more than one "fiduciary" wavelength to be accomplished.

Operation of other ferroelectric photonic devices of interest, for example as logic gates, as computational elements, and as optical switches, can be tested and calibrated by providing one or more fixed laser sources (e.g., line sources) and/or photonic bandgap structures (which act as line or notch filters) in suitable combination. As will be understood, in some embodiments, the presence of one or more photonic bandgap devices such as laser source 2040, photonic bandgap structure 2045, and one or more sensors 2050 can be used to provide diagnostic capabilities in an integrated structure that comprises one or more ferroelectric photonic devices that operate according to principles of the invention.

Operation of an Exemplary Device

Figure 21:
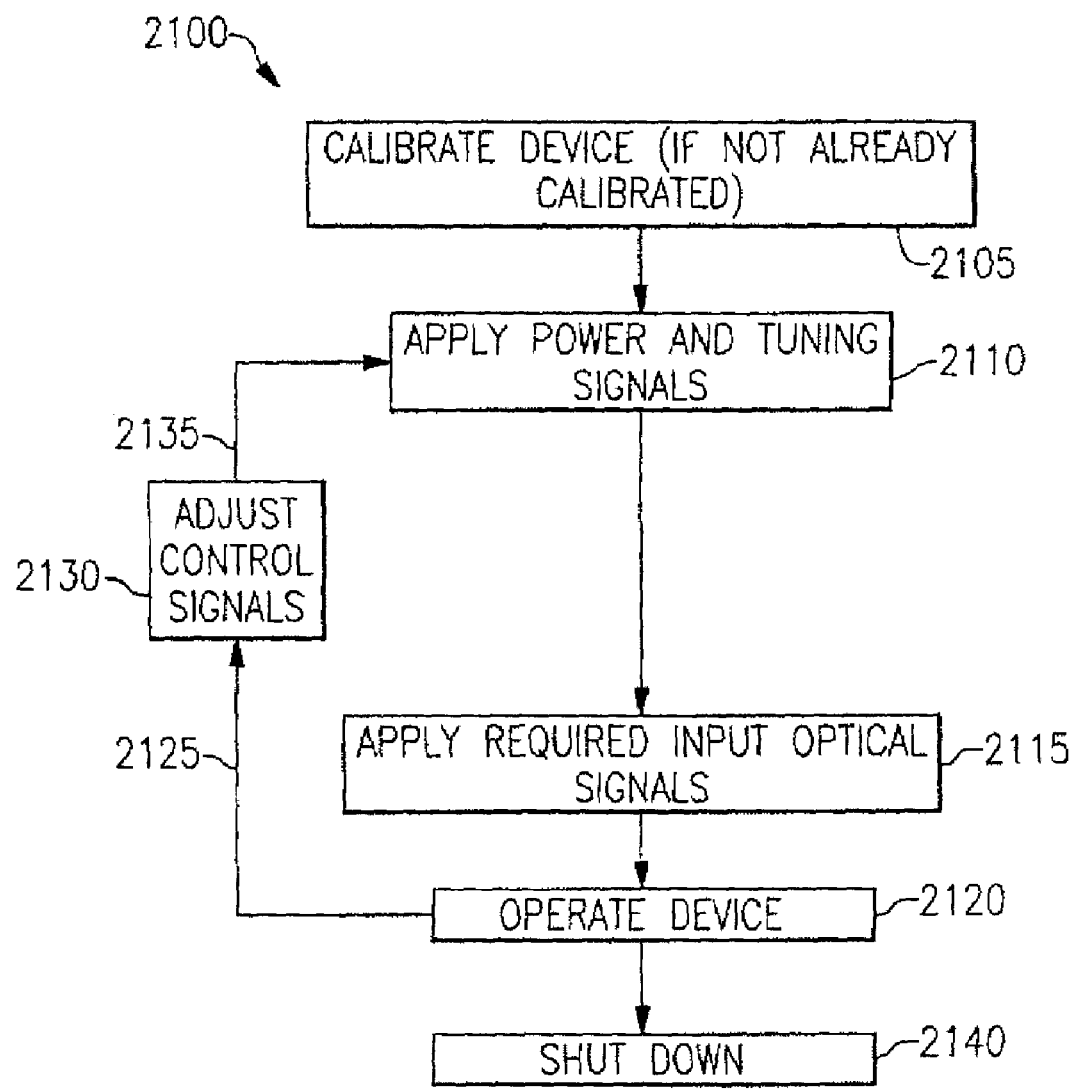
FIG. 21 is a flowchart that shows steps in the operation of a ferroelectric photonic device.

FIG. 21 is a flowchart 2100 that shows steps in the operation of a ferroelectric photonic device. As has just been described, the ferroelectric photonic device can be calibrated, represented by box 2105. Once calibration is accomplished, the calibration values needed to operate a particular ferroelectric photonic device in a specified mode of operation are available in a recorded memory, perhaps in the form of a look-up table. In one embodiment, a ferroelectric photonic device is operated by powering the control circuit and the apparatus used to apply one or more tuning fields or tuning signals, including, as necessary, retrieval of parameters useful for operating the device from a memory. This is indicated at box 2110. As necessary, one can further apply to an optical input port an optical signal to be manipulated. This step is indicated at box 2115. In some embodiments, such as operation of the ferroelectric photonic device as an optical source, there may not need to be an input signal provided by an external source to an optical input port. The ferroelectric photonic device can provide at least one optical output signal at an optical output port. Upon being activated, the ferroelectric photonic device manipulates light, and provides an output signal. The operation of the device to produce a result, in the form of an optical output signal, is indicated at box 2120. In some embodiments, a feedback loop is provided. The feedback loop includes a detector that receives an output signal from the ferroelectric photonic device and provides a feedback signal in response to the received signal to the control circuit. The provision of a feedback signal is indicated by the arrow 2125. The control circuit compares the feedback signal to a desired value. As necessary, the control circuit makes adjustments to cause the output signal to fall within a desired range. The steps of comparing the feedback signal to the desired value and computing an adjustment are indicated by box 2130. The adjustments can include changing a drive signal or a control signal to the apparatus used to apply one or more tuning fields, so that the output of the ferroelectric photonic device conforms to the desired value or at least to a value within an acceptable range. The control circuit can include a programmable computer or controller, so that the operation of the ferroelectric photonic device can be controlled statically or dynamically (e.g., can maintain a specific mode of operation over time, or can provide time varying operation). The adjusted control signal is applied to the device, as shown by the arrow 2135. When the operation of the ferroelectric photonic device is no longer required, operation is terminated by removing the tuning fields or signals, the optical inputs, and the applied power in an orderly manner so as not to damage the device or any object that receives output signals from the device. This is indicated by the box 2140, labeled "shut down."

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Suitable general purpose computers that are contemplated in connection with this disclosure include any conventional programmable computer, from a microprocessor-based or micro-controller based chip through handheld, portable, desktop, server, and mainframe computers. Input/output capabilities provided for the use of a user of the computer can include, but are not limited to, a button, a keypad, a keyboard, a touch screen, a microphone, a pointing device such as a joystick or trackball, a video camera, a video display, and an audio output device such as a speaker, alone or in combination. Input/output can be accomplished to other local or remote computers, by any hard-wired or wireless medium, including but not limited to electrical signals, optical or infrared signals, and electromagnetic signals. The general purpose computer or controller can include memory (or machine readable storage media) to store data, to hold commands, and to retain information useful to define the state of operation of the computer itself.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. A photonic bandgap light manipulation apparatus having a tunable property, comprising:

a photonic bandgap structure having a dispersion relation, said photonic bandgap structure comprising a ferroelectric material, said photonic bandgap structure having at least one of an optical input port for receiving an optical input signal and an optical output port for providing an optical output signal;

a control circuit that controls an application of a tuning signal to said ferroelectric material; and at least one structure operatively connected to said ferroelectric material and to said control circuit, said at least one structure configured to apply said tuning signal to said ferroelectric material;

whereby said property of said photonic bandgap light manipulation apparatus is tuned to provide a manipulation of at least one of said optical input signal that is received at said apparatus at said optical input port and said optical output signal that is provided by said apparatus at said optical output port.

2. The photonic bandgap light manipulation apparatus of claim 1, wherein said manipulation of light is a switching operation.

3. The photonic bandgap light manipulation apparatus of claim 1, wherein said manipulation of light is a logic operation.

4. The photonic bandgap light manipulation apparatus of claim 1, wherein said manipulation of light is a modulation of light.

5. The photonic bandgap light manipulation apparatus of claim 1, wherein said manipulation of light is a memory operation.

6. The photonic bandgap light manipulation apparatus of claim 1, wherein said manipulation of light is a computation operation.

7. The photonic bandgap light manipulation apparatus of claim 1, wherein said manipulation of light involves controlling a propagation direction of a beam of light.

8. The photonic bandgap light manipulation apparatus of claim 1, wherein said tuning signal is an electrical signal.

9. The photonic bandgap light manipulation apparatus of claim 1, wherein said tuning signal is a mechanical force.

10. The photonic bandgap light manipulation apparatus of claim 1, wherein said tuning signal is an optical signal.

11. The photonic bandgap light manipulation apparatus of claim 1, wherein said tuning signal is a thermal signal.

12. The photonic bandgap light manipulation apparatus of claim 1, wherein said at least one structure configured to apply said tuning signal to said ferroelectric material is an electrode.

13. The photonic bandgap light manipulation apparatus of claim 12, wherein said electrode comprises a metal.

14. The photonic bandgap light manipulation apparatus of claim 12, wherein said electrode comprises an oxide.

15. The photonic bandgap light manipulation apparatus of claim 12, wherein said electrode comprises a carbon nanotube.

16. The photonic bandgap light manipulation apparatus of claim 12, wherein said electrode comprises a doped semiconductor.

17. The photonic bandgap light manipulation apparatus of claim 1, wherein said at least one structure configured to apply said tuning signal to said ferroelectric material is a mechanical device.

18. The photonic bandgap light manipulation apparatus of claim 1, wherein said at least one structure configured to apply said tuning signal to said ferroelectric material is an optical source.

19. The photonic bandgap light manipulation apparatus of claim 1, further comprising a feedback loop that includes a detector that receives an output signal from said apparatus and provides a signal in response to said received signal to said control circuit.

20. The photonic bandgap light manipulation apparatus of claim 1, further comprising a power supply that provides power to at least one of said control circuit and said at least one structure configured to apply said tuning signal to said ferroelectric material.

\* \* \* \* \*